United States Patent
Zhou et al.

(10) Patent No.: US 10,595,354 B1
(45) Date of Patent: Mar. 17, 2020

(54) COMMUNICATING WITH A WIRELESS DEVICE VIA AT LEAST TWO ACCESS NODES

(71) Applicant: Sprint Spectrum LP, Overland Park, KS (US)

(72) Inventors: Yu Zhou, Herndon, VA (US); Noman Alam, Chantilly, VA (US); Ankur Sharma, Plano, TX (US)

(73) Assignee: Sprint Spectrum L.P., Overland Park, KS (US)

( * ) Notice: Subject to any disclaimer, the term of this patent is extended or adjusted under 35 U.S.C. 154(b) by 65 days.

(21) Appl. No.: 15/902,377

(22) Filed: Feb. 22, 2018

(51) Int. Cl.
| | |
|---|---|
| *H04W 76/15* | (2018.01) |
| *H04W 88/04* | (2009.01) |
| *H04W 72/04* | (2009.01) |
| *H04L 12/761* | (2013.01) |
| *H04W 40/22* | (2009.01) |

(52) U.S. Cl.
CPC ............ *H04W 76/15* (2018.02); *H04L 45/16* (2013.01); *H04W 40/22* (2013.01); *H04W 72/0486* (2013.01); *H04W 88/04* (2013.01)

(58) Field of Classification Search
None
See application file for complete search history.

(56) References Cited

U.S. PATENT DOCUMENTS

| | | | | |
|---|---|---|---|---|
| 9,380,637 | B2* | 6/2016 | Huang | H04B 7/15528 |
| 9,526,044 | B2 | 12/2016 | Choi et al. | |
| 9,571,587 | B1* | 2/2017 | Zhou | H04W 72/00 |
| 2011/0080892 | A1* | 4/2011 | Cai | H04W 36/0033 370/331 |
| 2011/0164542 | A1* | 7/2011 | Cai | H04B 7/155 370/312 |
| 2011/0235569 | A1* | 9/2011 | Huang | H04W 28/02 370/315 |
| 2014/0335869 | A1* | 11/2014 | Choi | H04W 36/0072 455/438 |
| 2018/0227282 | A1* | 8/2018 | Lee | H04L 63/061 |
| 2019/0044754 | A1* | 2/2019 | Hampel | H04B 7/155 |

FOREIGN PATENT DOCUMENTS

WO     2014/179982 A1     11/2014

\* cited by examiner

*Primary Examiner* — Donald L Mills

(57) ABSTRACT

Dual connectivity operations described herein include splitting a PDU into at least first and second portions of data addressed to or from first and/or second network addresses of a wireless device respectively, and modifying a source/destination address of the second portion of data from the first network address to the second network address in the downlink direction, and from the second network address to the first network address in the uplink direction. Uniquely-marked bearers set up between relay access nodes and donor access nodes (and gateways associated therewith) enable transmission of portions of data to and from the different network addresses.

20 Claims, 18 Drawing Sheets

COMMUNICATING WITH A WIRELESS DEVICE VIA AT LEAST TWO ACCESS NODES

TECHNICAL BACKGROUND

Wireless networks incorporating access nodes, relay access nodes, and other small-cell access nodes are becoming increasingly common, and may be referred to as heterogeneous networks. Relay access nodes improve service quality by relaying communication between an access node, and wireless devices in the wireless network. For example, relay access nodes may be used at the edge of a coverage area of an access node to improve coverage and/or service, as well as in crowded areas having a high number of other wireless devices to increase the available throughput to the wireless devices being relayed. Relay access nodes are generally configured to communicate with the access node (i.e. a "donor" access node) via a wireless backhaul connection, and to deploy a radio air-interface to which wireless devices can attach.

"Dual Connectivity" refers to the ability for wireless devices to attach to two or more access nodes, and transmit/receive information via two wireless connections simultaneously. However, there are limits to utilizing dual connectivity in networks comprising access nodes and relay access nodes.

Overview

Exemplary embodiments described herein include systems, methods, and processing nodes for communicating with a wireless device via at least two access nodes. An exemplary method described herein for communicating with a wireless device via at least two access nodes includes receiving, at a donor access node coupled to a relay access node, a first portion of data and a second portion of data, wherein both first and second portions of data are addressed to a first network address of a wireless device; modifying a destination address of the second portion of data from the first network address of the wireless device to a second network address of the wireless device; transmitting the first portion of the data to the first network address of the wireless device via a first wireless communication link between the donor access node and the wireless device; and transmitting the second portion of the data to the second network address of the wireless device via the relay access node, wherein the relay access node transmits the second portion of the data to the second network address of the wireless device via a second wireless communication link between the relay access node and the wireless device.

An exemplary system described herein for communicating with a wireless device via at least two access nodes includes a donor access node configured to provide a first radio air interface to which a wireless device is attached, and a relay access node configured to attach to the first radio air interface and to provide a second radio air interface to which the wireless device is further attached. The donor access node is further configured to perform operations comprising receiving a first portion of data from a first network address of the wireless device via the first radio air interface. The first network address comprises one of at least two network addresses of the wireless device. The operations further comprise transmitting the first portion of data to a gateway node in a first virtual bearers. The relay access node is further configured to perform operations comprising receiving, via the second radio air interface, a second portion of data from a second network address of the wireless device, encapsulating the second portion of data in a second virtual bearer set up between the relay access node and the donor access node, modifying a header within the second virtual bearer to include an indicator, and transmitting the second data portion in the second virtual bearer to the donor access node. The donor access node is further configured to perform operations comprising receiving the second portion of data from the relay access node, de-encapsulating the second portion of data, modifying a source address of the second portion of data from the second network address to the first network address, and transmitting the second portion of data to the gateway node in a third virtual bearer.

An exemplary processing node described herein for communicating with a wireless device via at least two access nodes is configured to perform operations including receiving, at a donor access node coupled to a relay access node, a first portion of data and a second portion of data, wherein both first and second portions of data are addressed to a first network address of a wireless device and received at the donor access node from a gateway node in first and second virtual bearers respectively; modifying a destination address of the second portion of data from the first network address of the wireless device to a second network address of the wireless device; transmitting the first portion of the data to the first network address of the wireless device via a first wireless communication link between the donor access node and the wireless device; and transmitting the second portion of the data to the second network address of the wireless device via a combination of the donor access node and a relay access node.

DETAILED DESCRIPTION

Figure 1:
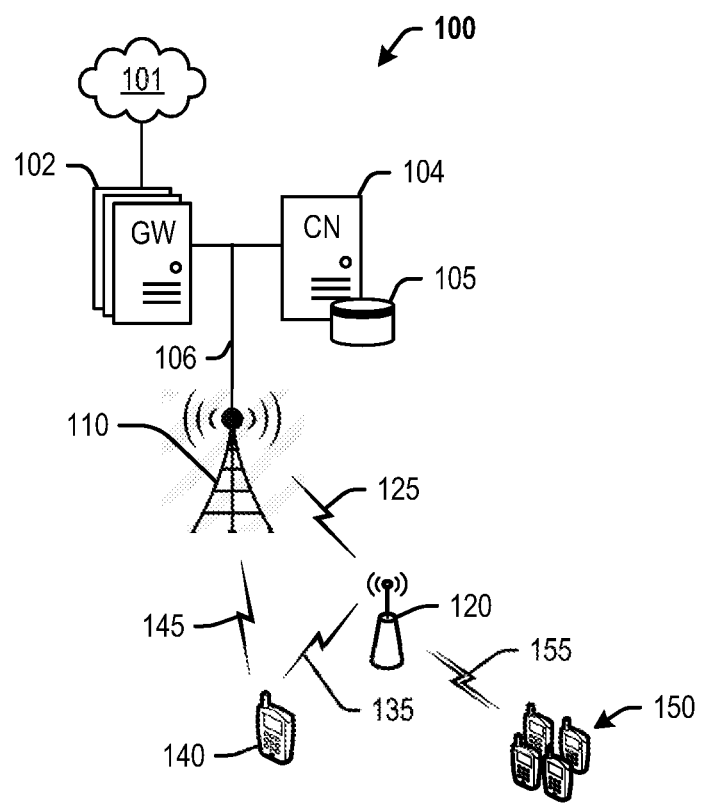
FIG. 1 depicts an exemplary system for communicating with a wireless device via at least two access nodes.

Exemplary embodiments described herein include systems, methods, and processing nodes for communicating with a wireless device via at least two access nodes. An exemplary system described herein includes at least a donor access node, such as an eNodeB in long-term evolution (LTE) networks, and a relay access node in wireless communication with the donor access node. The donor access node is configured to deploy a first wireless air-interface to which wireless devices and/or relay access nodes can attach. The relay access node is configured to communicate with the donor access node via a wireless backhaul connection (hereinafter, "backhaul") provided on the first wireless air-interface, and is further configured to deploy a second wireless air-interface to which wireless devices can attach and access network services from the donor access node. In other words, the relay access node is configured to relay data packets between the donor access node and wireless devices attached to the relay access node.

Further, wireless devices illustrated herein are generally capable of communicating with at least two access nodes. In LTE networks, this capability is termed "dual connectivity." The exemplary embodiments disclosed herein include systems, methods, and processing nodes that are configured to perform dual connectivity operations for wireless devices attached to a combination of a donor access node and a relay access node, as described above. For example, systems described herein include at least a donor access node and a relay access node to which a wireless device is attached, and a gateway node configured to communicate with an external network (i.e. a network external to the wireless network). In a downlink direction, data packets addressed to the wireless device may be received at the gateway, divided or split into at least first and second data portions, and transmitted to the wireless device separately via each of the donor access node and the relay access node. The first and second data portions may be routed via various bearers to a first and second network address of the wireless device respectively. Upon receiving the first and second data portions, the wireless device may be configured to reassemble the first and second data portions to obtain the original data packets. Similarly, in the uplink direction, the wireless device may be configured to split data packets into first and second data portions, designate first and second source addresses for the first and second data portions respectively, and transmit each portion to the gateway via a combination of the donor access node and relay access node in corresponding bearers.

In exemplary embodiments depicted herein, a downlink data packet addressed to the wireless device is received at the gateway node from a network node external to the wireless network. The data addressed to the wireless device may comprise a protocol data unit (PDU), such as a data packet or similar unit of data. Further, the data may be addressed to a first network address of the wireless device. The gateway node is configured to divide the data into first and second data portions respectively, encapsulate the first data portion into a first virtual bearer between the gateway node and the donor access node, and encapsulate the second data portion into a second virtual bearer between the gateway node and the donor access node. The data may be divided into the first and second portions by splitting the PDU into the first and second portions. The gateway node may be configured to split the PDU into the first and second data portions based on a load level reported by each of the donor access node and the relay access node. A size of the first and second portions of data may be determined based on a load level of each of the donor and relay access nodes. For example, the gateway node may be directly connected to at least the donor access node, and receive load information therefrom. Further, the relay access node may transmit load information to the donor access node, which in turn transmits the load information to the core network. The gateway node is further configured to mark a header of one or both of the first and second virtual bearers with a unique indicator. The gateway node then transmits each data portion to the donor access node in its respective virtual bearer.

In exemplary embodiments described herein, a donor access node may receive first and second data portions from a gateway node via first and second virtual bearers respectively, and determine that the first and second data portions are portions of a split PDU based in part on a unique indicator within a header of one or both of the first and second virtual bearers. Based thereon, the donor access node may be configured to modify a destination address of the second data portion from a first network address of the wireless device to a second network address of the wireless device. For example, first and second IP addresses may be generated for the wireless device respectively by the two different gateways that the wireless device connects to via donor access node and relay access node, and associated with the same wireless device, while being mapped to different bearers. Each bearer is associated with a different access node. For example, a first bearer may comprise a first radio bearer set up between the donor access node and the first IP address of the wireless device, and the second bearer is associated with the relay access node, and comprises a combination of a second radio bearer set up between the donor access node and the relay access node, and a third radio bearer set up between the relay access node and the wireless device. Thus, the donor access node may be configured to transmit the first data portion directly to the first network address of the wireless device via the first radio bearer, and transmit the second data portion to the relay access node via the second radio bearer. Upon receiving the second data portion, the relay access node transmits the second data portion to the second IP address of the wireless device.

In exemplary embodiments depicted herein, at least one of the first and second portions of data may be further divided or split into third and fourth portions of data. Thus, the original data intended to be transmitted to the wireless device is split into the first, third, and fourth portions of data, with the third and fourth portions of data being portions of the previously second portion of data. In an exemplary embodiment, the donor access node is configured to divide the second portion of data into the third and fourth portions of data based on a cell load of each of the donor access node and the relay access node. Further, the donor access node may be configured to transmit the first and third portion of data directly to the first network address of the wireless device via the radio bearer between the donor access node and the wireless device, and transmit the fourth portion of data to the second network address of the wireless device via the relay access node.

In exemplary embodiments described herein, uplink data generated at the wireless device and addressed to an external destination node may be split, at the wireless device, into first and second portions of data intended to be transmitted to the network via the donor access node and the relay access node respectively. Similar to the downlink data, the uplink data may comprise a protocol data unit (PDU), such as a data packet or similar unit of data. Further, the wireless device may be configured to define a source address of each of the first and second portions of data as first and second network addresses of the wireless device respectively due to the different gateways that the donor access node and relay access node connect to. Both first and second network addresses may comprise IP addresses. The wireless device may be configured to split the PDU based on a load of each of the donor access node and the relay access node. Further, the first and second IP addresses may be generated and associated with the wireless device, while being mapped to different bearers. Each bearer is associated with a different access node. For example, a first bearer may comprise a first radio bearer set up between the first network address of the wireless device and the donor access node, and the second bearer is associated with the relay access node, and comprises a combination of a second radio bearer set up between the second network address of the wireless device and the relay access node, and a third radio bearer set up between the relay access node and the donor access node. Thus, the wireless device may transmit the first data portion directly to the donor access node within the first radio bearer, and transmit the second portion to the relay access node within the second radio bearer.

In exemplary embodiments described herein, a relay access node receives a portion of data sourced from a second network address of a wireless device, and encapsulates the second data portion within a virtual bearer that is set up between the relay access node and a donor access node. The portion of data may comprise the second portion of data split at the wireless device. Further, the relay access node modifies a header of the virtual bearer to include a unique indicator, which enables the donor access node to determine that the portion of data received from the relay access node is a portion of the PDU split at the wireless device. The relay access node transmits the portion of data to the donor access node via the virtual bearer. The virtual bearer may include a radio bearer between the relay access node and the donor access node.

In exemplary embodiments described herein, a donor access node receives a first portion of a split PDU from a first network address of a wireless device, and a second portion of the split PDU from a second network address of the wireless device via a relay access node. The first portion of the split PDU may be sourced from a first network address of the wireless device, and the second portion of the split PDU may be sourced from a second network address of the wireless device. The second portion of the split PDU may be received in a virtual bearer set up between the relay access node and the donor access node. Further, the donor access node may be configured to determine that the second portion is a portion of the split PDU based on a unique indicator within a header of the virtual bearer. The donor access node may further be configured to modify a source address of the second portion of the split PDU from the second network address of the wireless device to the first network address of the wireless device, such that both first and second data portions are sourced from the first network address of the wireless device. Subsequently, the donor access node transmits the first and second data portions to a gateway node, whereupon the gateway node combines or reassembles the first and second data portions to form the original PDU, and transmits the PDU to the external destination node, with the original PDU indicating the first network address of the wireless device as the source address.

In exemplary embodiments depicted herein, at least one of the first and second portions of data may be further divided or split into third and fourth portions of data. Thus, the original data intended to be transmitted to the destination node from the wireless device is split into the first, third, and fourth portions of data, with the third and fourth portions of data being portions of the previously second portion of data. Alternatively or in addition, the original data is simply split into three portions of data. In either case, the wireless device may be configured to generate the three split portions of data based on a cell load of each of the donor access node and the relay access node. Further, the wireless device may be configured to set a source address of the first and third portions of data to a first network address of the wireless device, and to set a source address of the fourth portion of data to the second network address of the wireless device. Subsequently, the wireless device transmits the first and/or third portions of data directly to the donor access node, and the fourth data portion to the relay access node, whereupon the relay access node encapsulates the fourth data portion in a virtual bearer marked with a unique indicator, and transmits the fourth data portion within the virtual bearer to the donor access node.

In exemplary embodiments described herein, a donor access node receives a first portion of a split PDU directly from a wireless device, a third portion of the split PDU directly from the wireless device, and a fourth portion of the split PDU from the wireless device via a relay access node. The first and third portions of the split PDU may be sourced from a first network address of the wireless device, and the fourth portion of the split PDU may be sourced from a second network address of the wireless device. The fourth portion of the split PDU received from the relay access node may be encapsulated within a virtual bearer set up between the relay access node and the donor access node. Further, the donor access node may be configured to determine that the fourth portion is a portion of the second portion of the PDU based on a unique indicator within a header of the virtual bearer (or within a header of data within the virtual bearer), and modify the source address of the fourth portion from the second network address of the wireless device to the first network address of the wireless device. The donor access node may further be configured to combine the third and fourth portions of the PDU to obtain the original second portion of the PDU (as was split by the wireless device), and set the source address of the second portion of the PDU as the first network address, such that both first and second data portions are sourced from the first network address of the wireless device. Subsequently, the donor access node transmits the first and second data portions to its corresponding gateway node, whereupon the gateway node combines or reassembles the first and second data portions to form the original PDU, and transmits the PDU to the external destination node, with the original PDU indicating the first network address of the wireless device as the source address.

In addition to the systems and methods described herein, these operations may be implemented as computer-readable instructions or methods, and processing nodes on the network for executing the instructions or methods. For example, a processing node coupled to a donor access node, a scheduler within the donor access node, or a controller node may be configured to perform the operations described herein. These and other embodiments are further described with reference to FIGS. 1-18 below.

FIG. 1 depicts an exemplary system for scheduling resources for relay access nodes in a wireless network. System 100 comprises a communication network 101, gateway node(s) 102, controller node 104, access node 110, relay access node 120, and wireless device 140. In other embodiments, any other combination of donor access nodes, relay access nodes, and wireless devices may be evident to those having ordinary skill in the art in light of this disclosure. In this exemplary embodiment, access node 110 may be a macrocell access node configured to deploy a wireless air-interface to which relay access node 120 and wireless device 140 can attach. For example, relay access node 120 may be configured to communicate with access node 110 over communication link 125, hereinafter referred to as a wireless backhaul or simply "backhaul, while wireless device 140 may be configured to communicate with access node 110 over a wireless communication link 145. Relay access node 120 is further configured to deploy an additional wireless air-interface to which wireless device 140 and wireless devices 150 can attach. Relay access node 120 is thus configured to relay data between donor access node 110 and wireless devices 140, 150, such that wireless devices 140, 150 may access network services using relay access node 120, rather than overload donor access node 110, which may be serving numerous other devices, such as wireless device 140. Moreover, wireless devices 150 that are outside a coverage area of access node 110 may access network services from donor access node 110 by virtue of being connected to relay access node 120.

Further, as described herein, wireless device 140 is capable of dual connectivity, i.e. simultaneously communicating with both donor access node 110 and relay access node 120. Alternatively or in addition, wireless device 140 may be configured with multi-access PDN connectivity (MAPCON), whereby wireless device 140 can send and receive data packets using two network addresses associated therewith. Further, to enable dual connectivity and/or MAPCON in system 100, a mobility management entity (MME) or a controller node 104 (and/or a processing node communicatively coupled thereto) may be configured to generate the at least two network addresses for wireless device 140 based on, for example, relay access node 120 connecting to a gateway node which is different from a gateway node to which donor access node 110 connects, and to map each of the traffic paths in dual connectivity to a corresponding bearer, transmit downlink data received from network 101 via each corresponding bearer, and transmit uplink data received from wireless device 140 from the at least two network addresses via each corresponding bearer to a destination node/device. In LTE systems, the bearers comprise evolved packet-switched system (EPS) bearers, as well as radio bearers 125, 135, 145.

The data addressed to wireless device 140 may comprise a protocol data unit (PDU), such as a data packet or similar unit of data. The data may be divided into the first and second portions by splitting the PDU into the first and second portions. A size of the first and second portions of data may be determined based on a load level of each of donor access node 110 and relay access node 120. For example, as further described herein, gateway node(s) 102 may be directly connected to at least donor access node 110 via communication link 106, and receive load information therefrom. Further, relay access node 120 may transmit load information to donor access node 110, which in turn transmits the load information to the core network. In embodiments associated with uplink transmission, wireless device 140 may utilize the load information to determine a size of first and second portions. In addition, embodiments described herein include splitting the second portion of data into third and fourth portions based on said load information.

Access node 110 can be any network node configured to provide communication between wireless devices 140, 150 and communication network 101, including standard access nodes such as a macro-cell access node, base transceiver station, a radio base station, an eNodeB device, an enhanced eNodeB device, or the like. In an exemplary embodiment, a macro-cell access node 110 can have a coverage area in the range of approximately five kilometers to thirty-five kilometers and an output power in the tens of watts. Further relay access node 120 may comprise any short range, low power, small-cell access nodes such as a microcell access node, a picocell access node, a femtocell access node, or a home eNodeB device. In addition, relay access node 120 may comprise a small-cell access node paired with a relay wireless device configured to communicate over backhaul 125, as further described herein.

Access node 110 and relay access node 120 can each comprise a processor and associated circuitry to execute or direct the execution of computer-readable instructions to perform operations such as those further described herein. Briefly, access node 110 and relay access node 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access node 110 and relay access node 120 can receive instructions and other input at a user interface. Access node 110 communicates with gateway node 102 and controller node 104 via communication links 106, 107. Access node 110 and relay access node 120 may communicate with each other, and other access nodes (not shown), using wireless link or backhaul 125, or a wired link such as an X2 link. Components of exemplary access nodes 110 and relay access node 120 are further described with reference to FIGS. 2-4.

Wireless devices 140, 150 may be any device, system, combination of devices, or other such communication platform capable of communicating wirelessly with access node 110 and/or relay access node 120 using one or more frequency bands deployed therefrom. Each of wireless devices 140, 150 may be, for example, a mobile phone, a wireless phone, a wireless modem, a personal digital assistant (PDA), a voice over internet protocol (VoW) phone, a voice over packet (VOP) phone, or a soft phone, as well as other types of devices or systems that can send and receive audio or data. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 140, 150. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, LocalTalk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication links 106, 107 may include S1 communication links. Other wireless protocols can also be used. Communication links 106, 107 can be a direct link or might include various equipment, intermediate components, systems, and networks. Communication links 106, 107 may comprise many different signals sharing the same link.

Gateway node(s) 102 can be any network node configured to interface with other network nodes using various protocols. Gateway node(s) 102 can communicate user data over system 100. Gateway node(s) 102 can be standalone computing devices, computing systems, or network components, and can be accessible, for example, by a wired or wireless connection, or through an indirect connection such as through a computer network or communication network. For example, gateway node(s) 102 can include a serving gateway (S-GW) and/or a public data network gateway (P-GW), etc. Gateway node(s) 102 can further include a relay S-GW and relay P-GW that perform equivalent functions as S-GW and P-GW but for relay access node 120. One of ordinary skill in the art would recognize that gateway node(s) 102 are not limited to any specific technology architecture, such as Long Term Evolution (LTE) and can be used with any network architecture and/or protocol.

Each of gateway node(s) 102 can comprise a processor and associated circuitry to execute or direct the execution of computer-readable instructions to obtain information. Gateway node(s) 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node(s) 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as configurations and capabilities of access node 110, relay access node 120, wireless devices 140, 150, external and internal network addresses of wireless device 140, mappings of internal network addresses with corresponding bearers, and so on. This information may be requested by or shared with gateway node(s) 102 and/or access node 110 via communication links 106, 107, X2 connections, and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Further, the methods, systems, devices, networks, access nodes, and equipment described herein may be implemented with, contain, or be executed by one or more computer systems and/or processing nodes. The methods described herein may also be stored on a non-transitory computer readable medium. Many of the elements of system 100 may be, comprise, or include computers systems and/or processing nodes. This includes, but is not limited to: gateway node(s) 102, controller node 104, access node 110, relay access node 120, and/or network 101.

Figure 2:
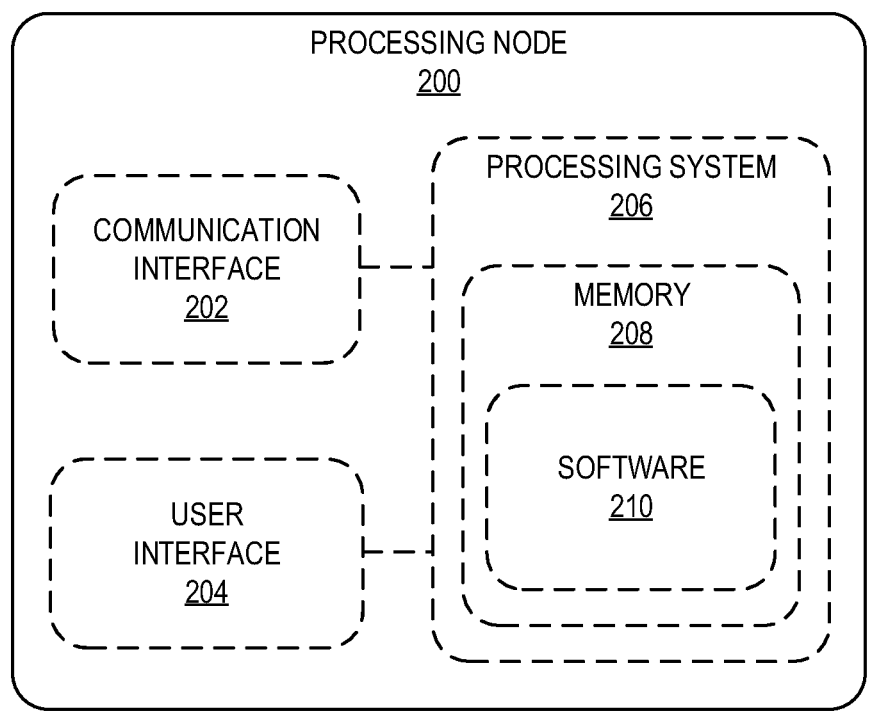
FIG. 2 depicts an exemplary processing node for communicating with a wireless device via at least two access nodes.

FIG. 2 depicts an exemplary processing node for scheduling resources for relay access nodes in a wireless network. Processing node 200 comprises a communication interface 202, user interface 204, and processing system 206 in communication with communication interface 202 and user interface 204. Processing system 206 includes storage 208, which can comprise a disk drive, flash drive, memory circuitry, or other memory device. Storage 208 can store software 210 which is used in the operation of the processing node 200. Storage 208 may include a disk drive, flash drive, data storage circuitry, or some other memory apparatus. For example, storage 208 may include a buffer. Software 210 may include computer programs, firmware, or some other form of machine-readable instructions, including an operating system, utilities, drivers, network interfaces, applications, or some other type of software. For example, software 210 may include a module for performing transmission power control operations described herein. Processing system 206 may include a microprocessor and other circuitry to retrieve and execute software 210 from storage 208. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

Figure 3:
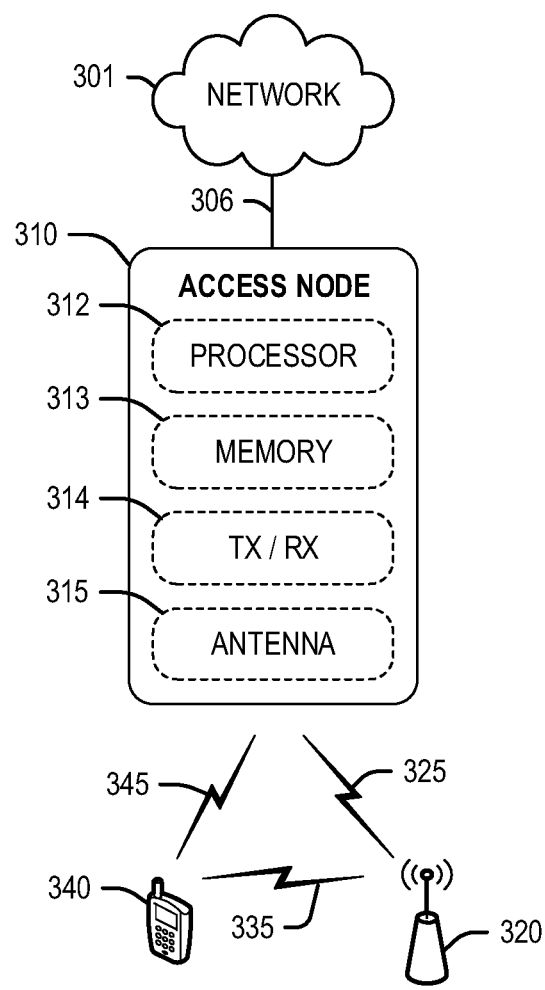
FIG. 3 depicts an exemplary access node.

FIG. 3 depicts an exemplary access node 310. Access node 310 may comprise, for example, a macro-cell access node, such as access node 110 described with reference to FIG. 1. Access node 310 is illustrated as comprising a processor 312, memory 313, transceiver 314, and antenna 315. Processor 312 executes instructions stored on memory 313, while transceiver 314 and antenna 315 enable wireless communication with wireless device 340 and relay access node 320. Instructions stored on memory 313 can include deploying an air-interface carrier to which wireless device 340 can attach to access network services directly, and to which relay access node 320 can attach and relay data packets between access node 310 and wireless device 340. Thus, access node 310 may be referred to as a donor access node. Donor access node 310 may further be configured to receive first and second data portions from network 301 (via, for instance, a gateway node not illustrated herein) via first and second virtual bearers respectively, and determine that the first and second data portions are portions of a split PDU based in part on a unique indicator within a header of one or both of the first and second virtual bearers. Based thereon, donor access node 310 may be configured to modify a destination address of the second data portion from a first network address of wireless device 340 to a second network address of wireless device 340. To enable this, first and second IP addresses may be generated and associated with wireless device 340 and mapped to different bearers by, for example, an MME or controller node in communication with access node 310 and network 301. For example, a first bearer may comprise first radio bearer 345 set up between donor access node 310 and the first IP address of wireless device 340, and the second bearer is associated with relay access node 320, and comprises a combination of a second radio bearer 325 set up between donor access node 310 and relay access node 320, and a third radio bearer 335 set up between relay access node 320 and wireless device 340. Thus, donor access node 310 may be configured to transmit the first data portion directly to the first network address of wireless device 340 via first radio bearer 345, and transmit the second data portion to relay access node 320 via second radio bearer 325. Upon receiving the second data portion, relay access node 320 transmits the second data portion to the second IP address of wireless device 340 via third radio bearer 335.

In exemplary embodiments depicted herein, donor access node 310 may be further configured to divide or split at least one of the first and second portions of data into third and fourth portions of data. Thus, the original data intended to be transmitted to wireless device 340 is split into the first, third, and fourth portions of data, with the third and fourth portions of data being portions of the previously second portion of data. In this exemplary embodiment, donor access node 310 is configured to divide the second portion of data into the third and fourth portions of data based on a cell load of each of donor access node 310 and relay access node 320. Further, donor access node 310 may be configured to transmit the third portion of data directly to the first network address of wireless device 340 via radio bearer 345, and transmit the fourth portion of data to the second network address of wireless device 340 via relay access node 320.

In exemplary embodiments described herein, uplink data generated at wireless device 340 and addressed to an external destination node (on, for example, network 301) may be split, at wireless device 340, into first and second portions of data intended to be transmitted to network 301 via donor access node 310 and relay access node 320 respectively. Similar to the downlink data, the uplink data may comprise a protocol data unit (PDU), such as a data packet or similar unit of data. Further, wireless device 340 may be configured to define a source address of each of the first and second portions of data as first and second network addresses of wireless device 340 respectively due to the different gateways that each of donor access node 310 and relay access node 320 connects to. Both first and second network addresses may comprise IP addresses. Wireless device 340 may be configured to split the PDU based on a load of each of donor access node 310 and relay access node 320. Further, the first and second IP addresses may be generated and assigned to wireless device 340 respectively by the two different gateways, or a controller node in communication with the gateways, and mapped to different bearers.

Thus, relay access node 320 receives a portion of data sourced from a second network address of wireless device 340, and encapsulates the second data portion within a virtual bearer that is set up between relay access node 320 and donor access node 310. The portion of data may comprise the second portion of data split at wireless device 340. Further, relay access node 320 modifies a header of the virtual bearer to include a unique indicator, which enables donor access node 310 to determine that the portion of data received from relay access node 320 is a portion of the PDU split at wireless device 340. Relay access node 320 transmits the portion of data to donor access node 310 via the virtual bearer including radio bearer 325. Donor access node 310 receives the first portion of the split PDU from the first network address of wireless device 340, and the second portion of the split PDU from the second network address of wireless device 340 via relay access node 320. Donor access node 310 may further be configured to determine that the second portion is a portion of the split PDU based on a unique indicator within a header of the virtual bearer, and to modify a source address of the second portion of the split PDU from the second network address of the wireless device to the first network address of wireless device 340, such that both first and second data portions are sourced from the first network address of wireless device 340. Subsequently, donor access node 310 transmits the first and second data portions to a gateway node, whereupon the gateway node combines or reassembles the first and second data portions to form the original PDU, and transmits the PDU to the external destination node on network 301, with the original PDU indicating the first network address of the wireless device as the source address.

Figure 4:
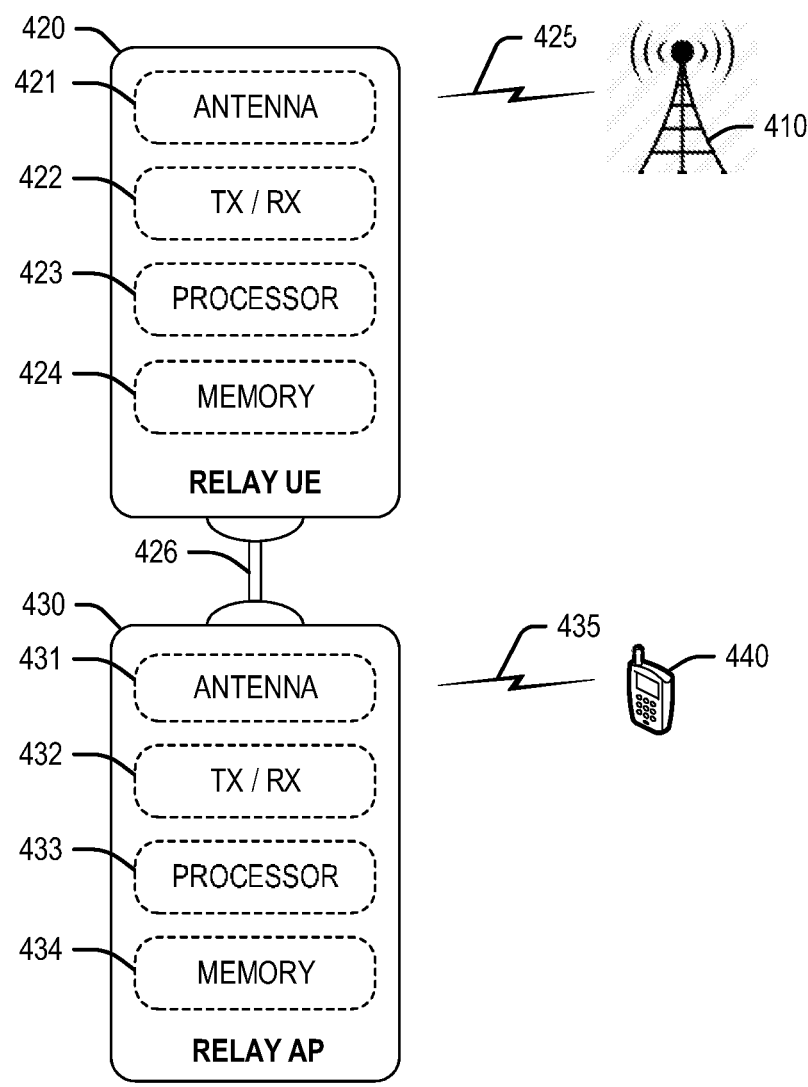
FIG. 4 depicts an exemplary relay access node comprising a relay wireless device and a relay access point.

FIG. 4 depicts an exemplary relay access node comprising a relay wireless device (UE) 420 and a relay access point (AP) 430. Relay wireless device 420 is illustrated as comprising an antenna 421 for direct (i.e. unrelayed) communication with donor access node 410 via wireless backhaul link 425, a transceiver 422, a processor 423, and a memory 424 for storing instructions that enable relay wireless device 420 to perform operations described herein. In some embodiments, relay wireless device 420 is referred to as a customer premise equipment (CPE), which includes any stationary LTE wireless device having a stronger computational & RF capability versus standard wireless devices, as well as a directional antenna and a dedicated power supply, enabling relay wireless device 420 to efficiently provide resources to wireless device 440 via relay access point 430. Consequently, relay access point 430 may be co-located with relay wireless device 420, and is connected to relay wireless device 420 via a communication interface 426. Communication interface 426 may be any interface that enables direct communication between relay wireless device 420 and relay access point 430, such as USB, FireWire, Ethernet, or any other serial, parallel, analog, or digital interface.

In operation, relay wireless device 420 may be configured to relay network services from donor access node 410 to wireless device 440 via relay access point 430. Relay wireless device 420 may begin to function as a relay wireless device by sending a message to donor access node 410 to indicate to donor access node 410 that wireless device 420 is functioning as a relay wireless device. In some embodiments, relay wireless device 420 can request to send a buffer status report to donor access node 410. Donor access node 410 can grant this request in a conventional manner. Relay wireless device 420 may respond to the grant by sending a short buffer status report. This short buffer status report is associated with a logical channel group that indicates the buffer status report is communicating the status of relay wireless device 420 as a relay, and thus is not asking for additional resource allocations (like a 'conventional' buffer status report would indicate). In other words, when relay wireless device 420 responds with a buffer status report for the 'special' logical channel group, it means that the buffer status report is not actually reporting the status of a buffer. Rather, this buffer status report indicates that the wireless device is now functioning as a relay. Once status of relay wireless device 420 is established, relay wireless device 420 may instruct relay access point 430 to start accepting connection requests from one or more wireless devices such as wireless device 440. Further, based on the indication of relay status, donor access node 410 may alter how relay wireless device 420 is treated. For example, relay wireless device 420 may be provided with preferential treatment because it is functioning as a relay.

Relay access point 430 is illustrated as comprising an antenna 431 and transceiver 432 for enabling communication with wireless device 440, processor 433, and a memory 434 for storing instructions that are executed by processor 433. In some embodiments, relay access point 430 may be a home eNodeB. Moreover, although only one transceiver is depicted in each of relay wireless device 420 and relay access point 430, additional transceivers may be incorporated in order to facilitate communication across interface 426 and other network elements.

Figure 5:
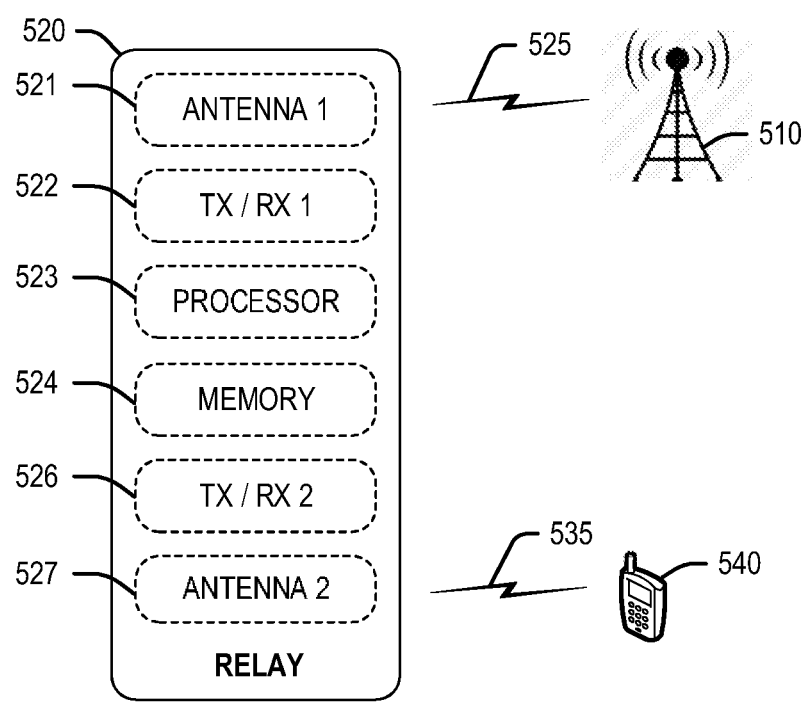
FIG. 5 depicts another exemplary relay access node.

In another exemplary embodiment, the relay access node may integrate components of a relay wireless device and a relay access point into a single unit. FIG. 5 depicts such an exemplary relay access node 520. Relay access node 520 is illustrated as comprising an antenna 521 for direct (i.e. unrelayed) communication with donor access node 510 via wireless backhaul link 525, a transceiver 522, a processor 523, and a memory 524 for storing instructions that are executed by processor 522 as described herein. Relay access node 520 further includes another transceiver 526 and antenna 527 for enabling communication with wireless device 520. Relay access node 520 can perform operations similar to those described with respect to FIG. 4.

In an embodiment, the relay access nodes depicted in FIG. 4-5 can be configured to function as one or more of a layer 1 (L1), layer 2 (L2), or layer 3 (L3) relay. A layer 1 relay functions as a booster or repeater. In other words, a layer 1 relay access node performs an amplify and forward (AF) function. RF signals received from a donor access node are amplified and transmitted to wireless devices. Likewise, RF signals received from wireless devices are amplified and transmitted to donor access nodes. Alternatively or in addition, a layer 2 relay access node performs a decode and forward (DF) function. RF signals received from a donor access node are demodulated and decoded, then encoded and modulated again before being transmitted to a wireless device. Likewise, RF signals received from a wireless device are demodulated and decoded, then encoded and modulated again before being transmitted to a donor access node. Alternatively or in addition, a layer 3 relay access node also performs a decode and forward function. However, a layer 3 relay access node also performs additional processing (such as ciphering and/or data concatenation/segmentation/resassembly). In other words, relay access node depicted herein performs demodulation and decoding of the received RF signals (either uplink or downlink), processes received data, then encodes, modulates, and transmits the data to a wireless device.

Figure 6:
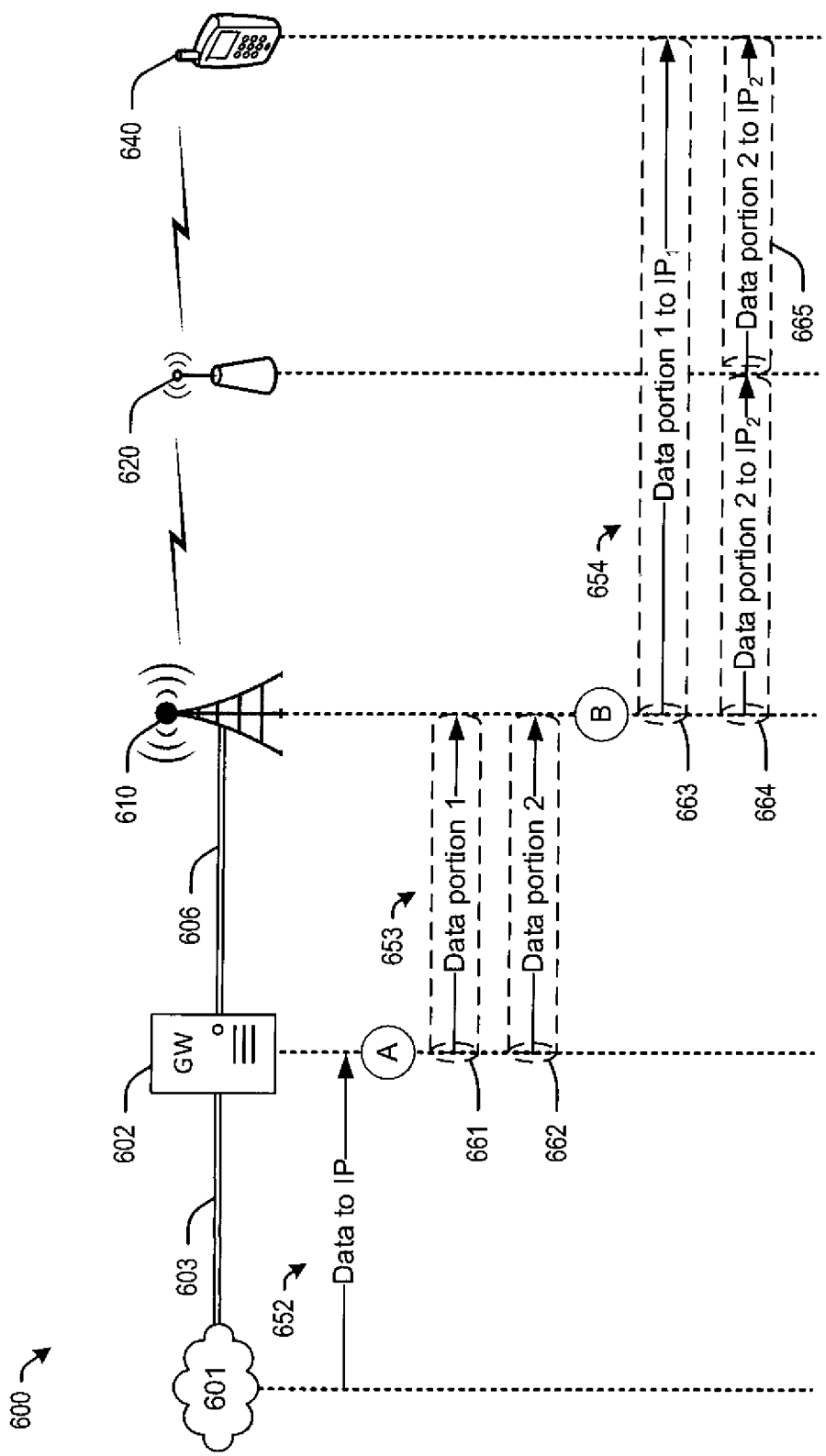
FIG. 6 depicts an exemplary network flow for transmitting downlink data to a wireless device via at least two access nodes.

FIG. 6 depicts an exemplary network flow for transmitting downlink data to a wireless device via at least two access nodes. The exemplary network flow of FIG. 6 may be implemented using components similar to those depicted in system 100, such as a network 601, gateway node(s) 602, donor access node 610, relay access node 620, and wireless device 640. In this embodiment, communication link 603 may comprise any interface capable of connecting gateway node(s) 602 to a packet-based network 601, such as an S5 interface. Communication link 606 comprises any interface capable of connecting gateway node(s) 602 to donor access node 610, such as an S4 or S5 interface, S11 interface, or S1-MME or S1-U interface. Further, donor access node 610, relay access node 620, and wireless device 640 communicate with one another via any number of wireless air-interfaces using LTE-uu or other wireless interfaces. Although FIG. 6 depicts components arranged (and steps performed) in a particular order for purposes of illustration and discussion, the components and operations discussed herein are not limited to any particular order or arrangement. One skilled in the art, using the disclosures provided herein, will appreciate that various features described herein can be omitted, rearranged, combined, and/or adapted in various ways. For example, gateway(s) 602 may comprise any combination of serving gateways (S-GW and P-GW) associated with donor access node 610, and relay gateways (relay S-GW and relay P-GW) associated with relay access node 620. Further, although not shown herein, any number of additional nodes such as proxy servers, home subscriber servers (HSS), and signaling performed between elements, may be apparent to those having ordinary skill in the art in light of this disclosure.

Further, as described herein, wireless device 640 is capable of dual connectivity, i.e. simultaneously communicating with both donor access node 610 and relay access node 620. Alternatively or in addition, wireless device 640 may be configured with multi-access PDN connectivity (MAPCON), whereby wireless device 640 can send and receive data packets using two network addresses associated therewith. For example, at 652, downlink data packets addressed to wireless device 640 may be received at gateway 602, at which point gateway 602 performs method A further described below with respect to FIG. 7. Briefly, gateway 602 divides or splits the incoming downlink data packets) into at least first and second data portions and, at 653, transmits the first and second data portions to donor access node 610 in bearers 661 and 662 respectively. Upon receiving the first and second data portions, donor access node 610 is configured to perform method B. Briefly, donor access node 610 addresses the two data portions respectively to first and second network addresses (i.e. $IP_1$ and $IP_2$) of wireless device 640, transmits the first data portion to wireless device 640 via a first bearer 663, and transmits the second data portion to wireless device 640 via combination of second and third bearers 664 and 665. Upon receiving the two data portions at its respective different network addresses, the wireless device may be configured to reassemble the first and second data portions to obtain the original data packets.

Donor access node 610 may further be configured to support two network addresses of wireless device 640 based on an attach request received at donor access node 610 from wireless device 640. The attach request may indicate that wireless device 640 is capable of attaching to both donor access node 610 and relay access node 620 simultaneously. Alternatively or in addition, donor access node 610 may be configured to determine a MAPCON capability of wireless device 640 based on a device capabilities message received at donor access node 610. Further, the addresses $IP_1$ and $IP_2$ may comprise individual network addresses that are associated with different gateways within gateway(s) 602. Bearers 661 and 662 may comprise virtual bearers, i.e. evolved packet-switched system (EPS) bearers, and bearers 663, 664, and 665 may comprise radio bearers (in addition to any virtual bearers configured thereon). Thus, the mapping of each bearer 661, 662 may further include information related to network addresses of each of donor access node 610 and relay access node 620. A controller node such as an MME (not illustrated herein) may have been configured to map first network address $IP_1$ to a first bearer and second network address $IP_2$ to a second bearer. However, bearers 661 and 662 are mapped to IP address $IP_1$, by virtue of the fact that both bearers 661 and 662 are associated with the serving gateway, i.e. the gateway used to transmit data via donor access node 610. Thus, according to embodiments described herein, donor access node 610 replaces the address header of data portion 2 in bearer 662 and instead transmits the packets via relay access node 620. In this case, the serving gateway within gateway(s) 602 is not aware of this address change.

Figure 7:
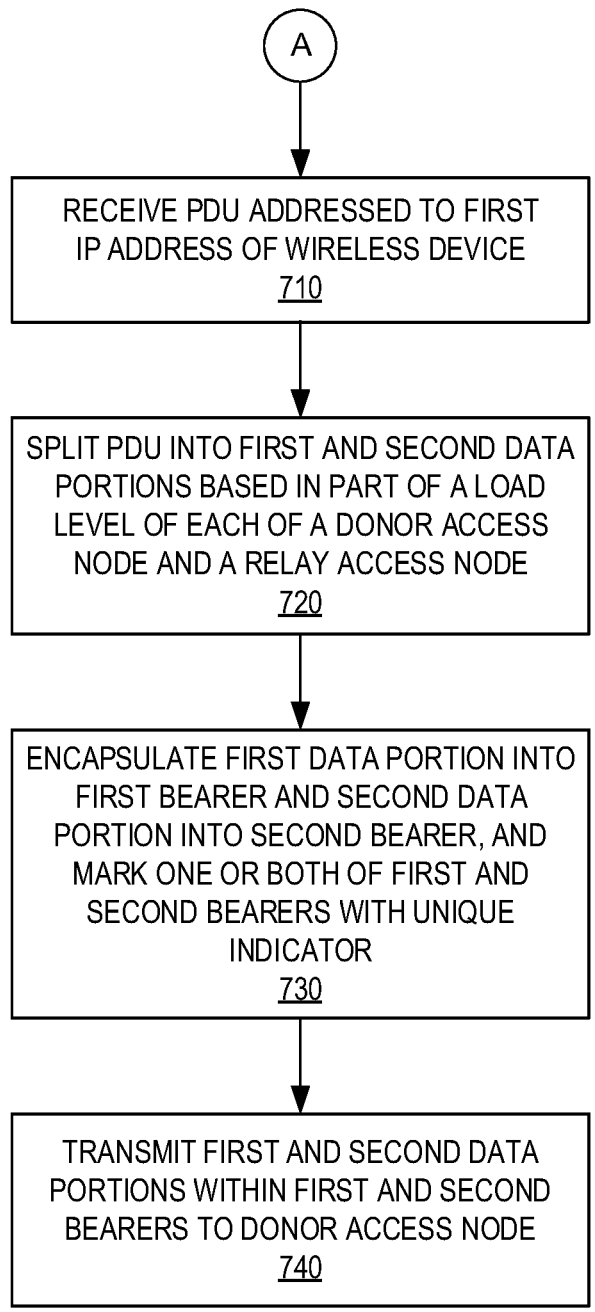
FIG. 7 depicts an exemplary method for splitting downlink data into portions.

FIG. 7 depicts an exemplary method for splitting downlink data into portions. The exemplary method of FIG. 7 may be implemented using components similar to those depicted in systems 100 and 600, such as gateway node(s) 102, 602. Although FIG. 7 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 710, a PDU addressed to a first network address of a wireless device is received. The PDU may comprise, for example, a downlink data packet addressed to the wireless device, and is received at a gateway node from a network node external to the wireless network. At 720, the PDU is divided into first and second data portions respectively. The data may be divided into the first and second portions by splitting the PDU into the first and second portions based on a load level reported by each of a donor access node and a relay access node. For example, a size of the first and second portions of data may be determined based on a load level of each of the donor and relay access nodes. The gateway node may be directly connected to at least the donor access node, and receive load information therefrom. Further, the relay access node may transmit load information to the donor access node, which in turn transmits the load information to the core network.

At 730, the first data portion is encapsulated into a first virtual bearer between the gateway node and the donor access node, and the second data portion is encapsulated into a second virtual bearer between the gateway node and the donor access node. Further, a header of one or both of the first and second virtual bearers is marked with a unique indicator. The unique indicator enables a donor access node to determine that received portions of data correspond to a split PDU. For example, the unique indicator may comprise an indicator within an IP field of the received portions of data. Subsequently, at 740, the gateway node transmits each data portion to the donor access node in its respective virtual bearer.

Figure 8:
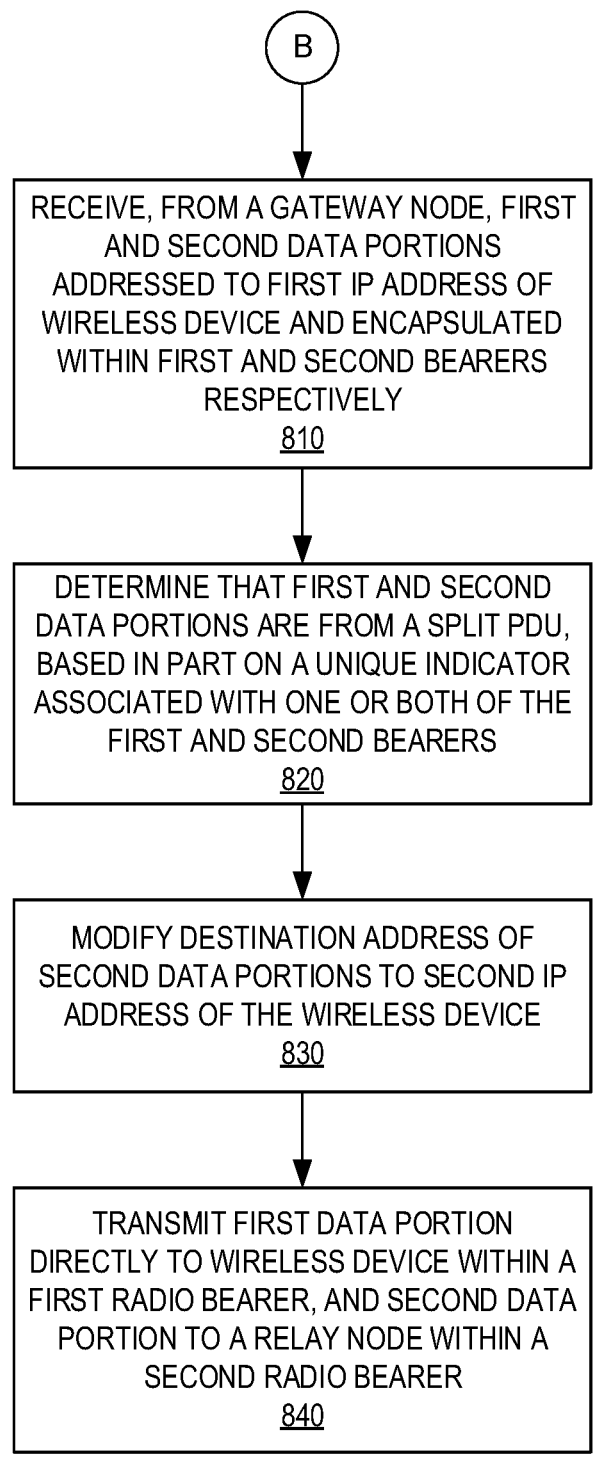
FIG. 8 depicts an exemplary method for transmitting portions of downlink data to at least two network addresses of a wireless device.

FIG. 8 depicts an exemplary method for transmitting portions of downlink data to at least two network addresses of a wireless device. The exemplary method of FIG. 8 may be implemented using components similar to those depicted in systems 100 and 600, such as donor access node(s) 110, 610. Although FIG. 8 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 810, a donor access node may receive first and second data portions from a gateway node via first and second virtual bearers respectively. The first and second data portions may be portions of a protocol data unit (PDU), such as a data packet or similar unit of data, that is addressed to a first network address of the wireless device. The gateway node may have divided the PDU into the first and second data portions and encapsulated the first data portion into a first virtual bearer between the gateway node and the donor access node and the second data portion into a second virtual bearer between the gateway node and the donor access node. Further, at 820, the donor access node may determine that the first and second data portions are portions of a split PDU based in part on a unique indicator within a header of one or both of the first and second virtual bearers. The unique indicator may comprise, for instance, any alphanumeric string included in a IP header of the data being transported within the virtual bearer.

Based thereon, at 830, the donor access node may be configured to modify a destination address of the second data portion from a first network address of the wireless device to a second network address of the wireless device. For example, first and second IP addresses may be generated for the wireless device, and associated with the same wireless device, while being mapped to different bearers. Each bearer is associated with a different access node. For example, a first bearer may comprise a first radio bearer set up between the donor access node and the first IP address of the wireless device, and the second bearer is associated with the relay access node, and comprises a combination of a second radio bearer set up between the donor access node and the relay access node, and a third radio bearer set up between the relay access node and the wireless device. Thus, at 840, the donor access node may be configured to transmit the first data portion directly to the first network address of the wireless device via the first radio bearer, and transmit the second data portion to the relay access node via the second radio bearer. Upon receiving the second data portion, the relay access node transmits the second data portion to the second IP address of the wireless device.

In exemplary embodiments depicted herein, at least one of the first and second portions of data may be further divided or split into third and fourth portions of data. Thus, the original data intended to be transmitted to the wireless device is split into the first, third, and fourth portions of data, with the third and fourth portions of data being portions of the previously second portion of data.

Figure 9:
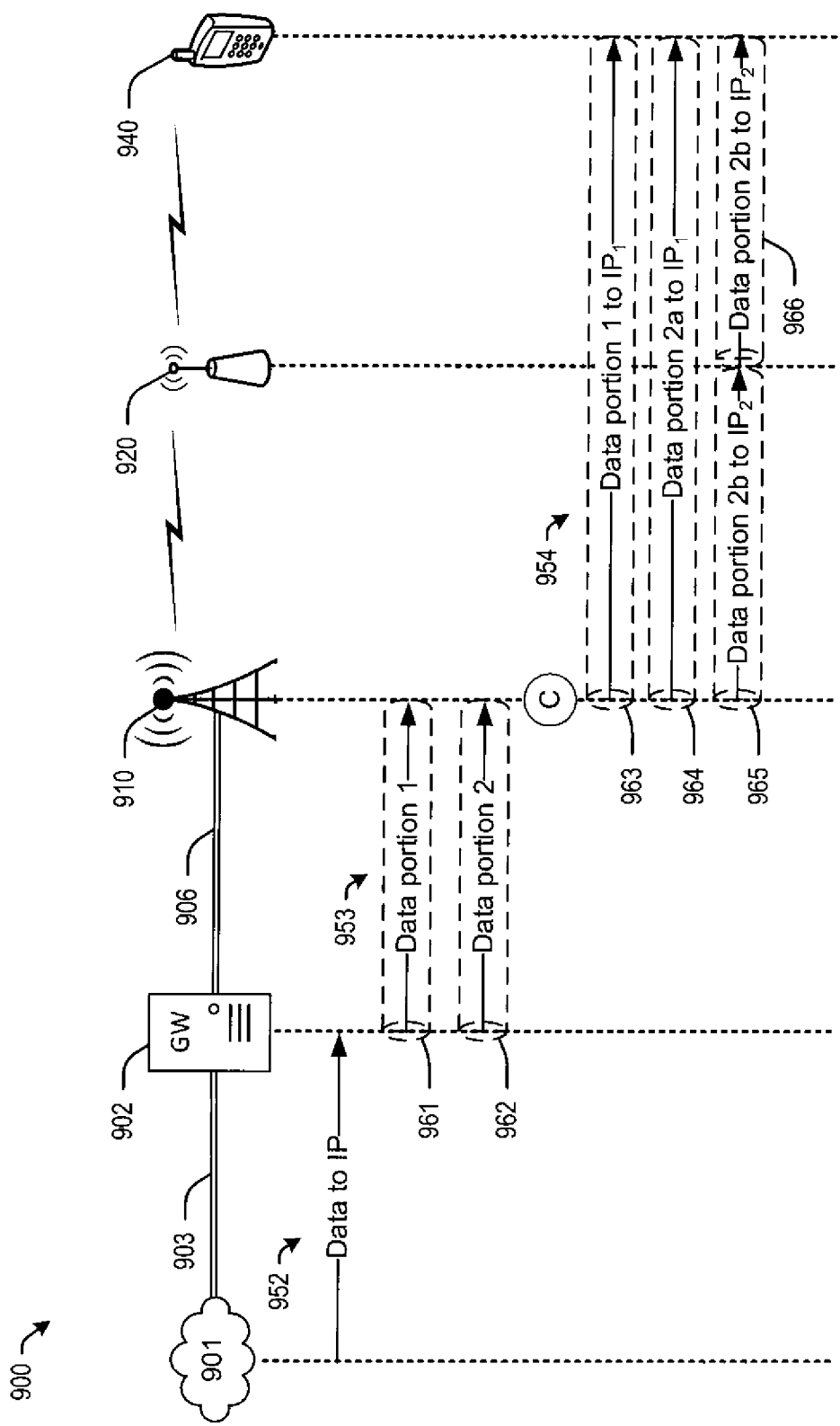
FIG. 9 depicts another exemplary network flow for transmitting downlink data to a wireless device via at least two access nodes.

FIG. 9 depicts such an exemplary network flow for transmitting downlink data to a wireless device via at least two access nodes. The exemplary network flow of FIG. 9 may be implemented using components similar to those depicted in system 100, such as a network 901, gateway node(s) 902, donor access node 910, relay access node 920, and wireless device 940. In this embodiment, communication link 903 may comprise any interface capable of connecting gateway node(s) 902 to a packet-based network 901, such as an S5 interface. Communication link 906 comprises any interface capable of connecting gateway node(s) 902 to donor access node 910, such as an S4 or S5 interface, S11 interface, or S1-MME or S1-U interface. Further, donor access node 910, relay access node 920, and wireless device 940 communicate with one another via any number of wireless air-interfaces using LTE-uu or other wireless interfaces. Although FIG. 9 depicts components arranged (and steps performed) in a particular order for purposes of illustration and discussion, the components and operations discussed herein are not limited to any particular order or arrangement. One skilled in the art, using the disclosures provided herein, will appreciate that various features described herein can be omitted, rearranged, combined, and/or adapted in various ways. For example, although not shown herein, any number of additional gateways such as PDN gateways (P-GW), proxy servers, home subscriber servers (HSS), and signaling performed between elements, may be apparent to those having ordinary skill in the art in light of this disclosure.

Further, as described herein, wireless device 940 is capable of dual connectivity, i.e. simultaneously communicating with both donor access node 910 and relay access node 920. Alternatively or in addition, wireless device 940 may be configured with multi-access PDN connectivity (MAPCON), whereby wireless device 940 can send and receive data packets using two network addresses associated therewith. For example, at 952, downlink data packets addressed to wireless device 940 may be received at gateway 902, at which point gateway 902 performs method A further described above with respect to FIG. 7. Briefly, gateway 902 divides or splits the incoming downlink data packets) into at least first and second data portions and, at 953, transmits the first and second data portions to donor access node 910 in bearers 961 and 962 respectively.

Upon receiving the first and second data portions, donor access node 910 is configured to perform method C. Briefly, donor access node 910 further divides or splits the second data portion into two additional data portions (i.e. a third data portion 2a and a fourth data portion 2b). Further, donor access node 910 addresses the first and third data portions to the first network address (i.e. $IP_1$) of wireless device 940, and the fourth data portion to the second network address (i.e. $IP_2$) of wireless device 920. Donor access node 910 may be configured to divide the second portion of data into the third and fourth portions of data based on a cell load of each of donor access node 910 and relay access node 920.

At 954, donor access node 910 transmits the first data portion (i.e. data portion 1) to wireless device 940 via a first bearer 963, transmits the third data portion (i.e. data portion 2a) to wireless device 940 via a second bearer 964 and transmits the fourth data portion (i.e. data portion 2b) to wireless device 940 via combination of third and fourth bearers 965 and 966. Upon receiving the three data portions 1, 2a, and 2b at its respective different network addresses, wireless device 940 may be configured to reassemble the first and second data portions to obtain the original data packets.

Donor access node 910 may further be configured to support two network addresses of wireless device 940 based on an attach request received at donor access node 910 from wireless device 940. The attach request may indicate that wireless device 940 is capable of attaching to both donor access node 910 and relay access node 920 simultaneously. Alternatively or in addition, donor access node 910 may be configured to determine a MAPCON capability of wireless device 940 based on a device capabilities message received at donor access node 910. Further, the addresses $IP_1$ and $IP_2$ may comprise individual network addresses that are associated with different gateways within gateway(s) 902. Bearers 961 and 962 may comprise virtual bearers, i.e. evolved packet-switched system (EPS) bearers, and bearers 963, 964, and 965 may comprise radio bearers (in addition to any virtual bearers configured thereon). Thus, the mapping of each bearer 961, 962 may further include information related to network addresses of each of donor access node 910 and relay access node 920. A controller node such as an MME (not illustrated herein) may have been configured to map first network address $IP_1$ to a first bearer and second network address $IP_2$ to a second bearer. However, bearers 961 and 962 are mapped to IP address $IP_1$, by virtue of the fact that both bearers 961 and 962 are associated with the serving gateway, i.e. the gateway used to transmit data via donor access node 910. Thus, according to embodiments described herein, donor access node 910 replaces the address header of data portion 2 in bearer 962 and instead transmits the packets via relay access node 920. In this case, the serving gateway within gateway(s) 902 is not aware of this address change.

Figure 10:
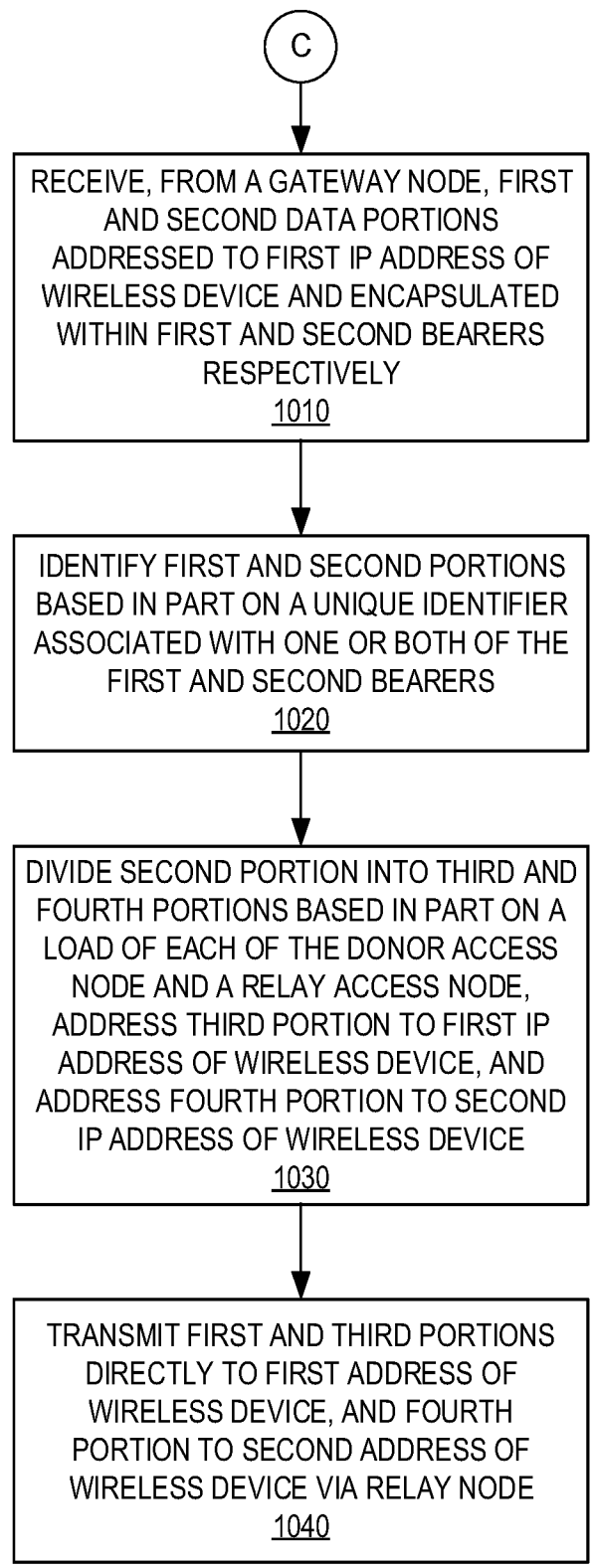
FIG. 10 depicts another exemplary method for splitting downlink data into portions and transmitting the portions to at least two network addresses of a wireless device.

FIG. 10 depicts another exemplary method for splitting downlink data into portions and transmitting the portions to at least two network addresses of a wireless device. The exemplary method of FIG. 10 may be implemented using components similar to those depicted in systems 100 and 900, such as donor access node(s) 110, 910. Although FIG. 10 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways. Further, the method of FIG. 10 is similar to the method of FIG. 8, with the addition of the donor access node being configured to divide the second portion of data into the third and fourth portions of data, and to transmit the third portion of data directly to the second network address of the wireless device and the fourth portion of data to the second network address of the wireless device via the relay access node.

For example, at 1010, the donor access node may receive first and second data portions from a gateway node via first and second virtual bearers respectively. The first and second data portions may be portions of a protocol data unit (PDU), such as a data packet or similar unit of data, that is addressed to a first network address of the wireless device. The gateway node may have divided the PDU into the first and second data portions and encapsulated the first data portion into a first virtual bearer between the gateway node and the donor access node and the second data portion into a second virtual bearer between the gateway node and the donor access node. Further, at 1020, the donor access node may identify and/or determine that the first and second data portions are portions of a split PDU based in part on a unique indicator within a header of one or both of the first and second virtual bearers. The unique indicator may comprise, for instance, any alphanumeric string included in a IP header of the data transported within the virtual bearer.

Based thereon, at 1030, the donor access node may be configured to divide the second portion of the split PDU into two additional parts, i.e. a third and fourth split portions, and keep a destination address of the third portion as a first network address and modify a destination address of the fourth portion from a first network address of the wireless device to a second network address of the wireless device. For example, first and second IP addresses may be generated for the wireless device, and associated with the same wireless device, while being mapped to different bearers. Each bearer is associated with a different access node. For example, a first bearer may comprise a first radio bearer set up between the donor access node and the first IP address of the wireless device, and the second bearer is associated with the relay access node, and comprises a combination of a second radio bearer set up between the donor access node and the relay access node, and a third radio bearer set up between the relay access node and the wireless device. Further, the division of the second portion into the third and fourth portions may be based on a load of each of the donor access node and the relay access node.

Subsequently, at 1040, the donor access node may be configured to transmit the first data portion directly to the first network address of the wireless device via the first radio bearer, the third data portion directly to the second network address of the wireless device (also via the first radio bearer), the fourth data portion to the relay access node via the second radio bearer, whereupon the relay access node transmits the fourth data portion to the second network address of the wireless device.

In exemplary embodiments described herein, uplink data generated at the wireless device and addressed to an external destination node may be split, at the wireless device, into first and second portions of data intended to be transmitted to the network via the donor access node and the relay access node respectively. FIGS. 11-18 depict exemplary embodiments based on uplink data.

Figure 11:
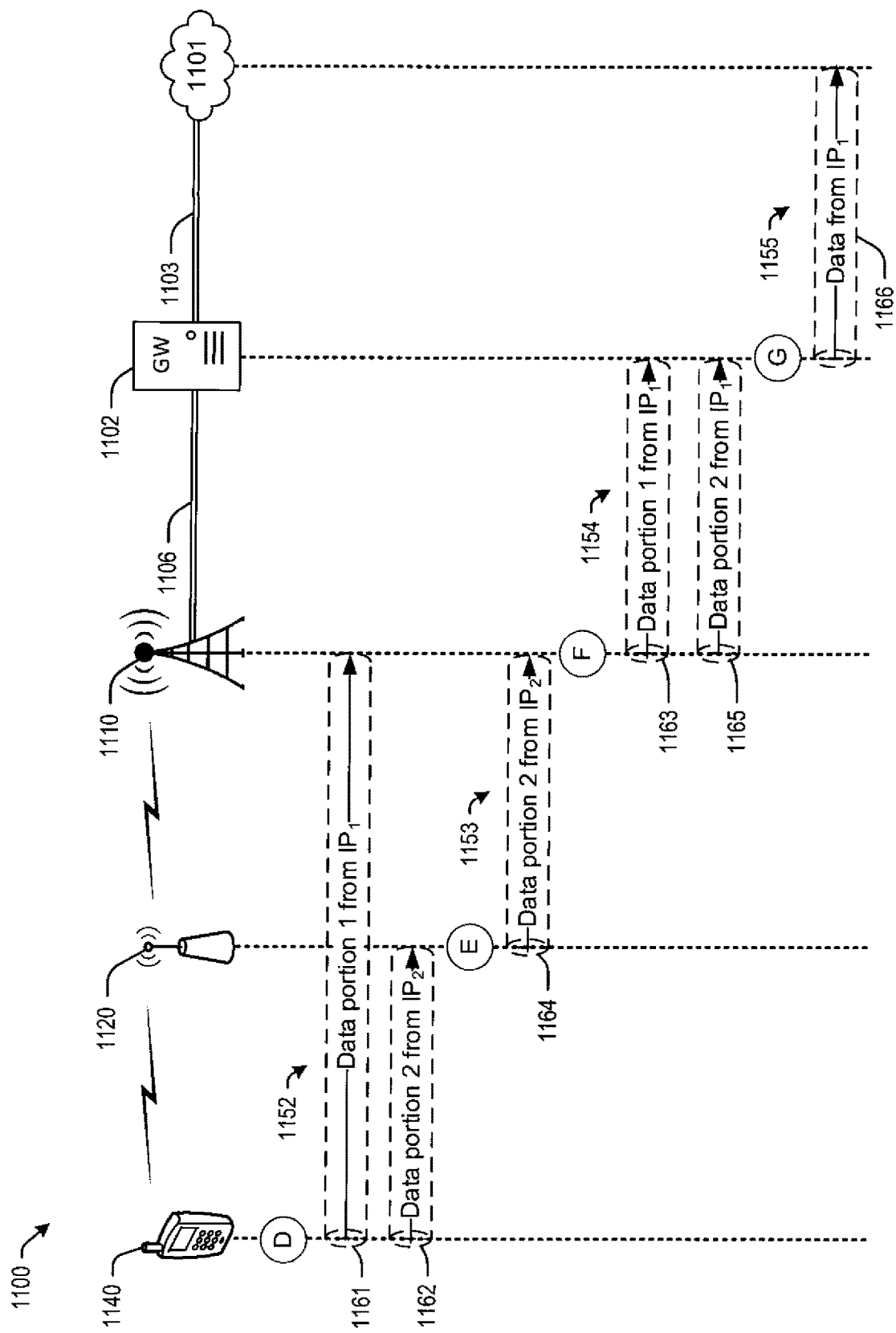
FIG. 11 depicts an exemplary network flow for transmitting uplink data from a wireless device via at least two access nodes.

For example, FIG. 11 depicts an exemplary network flow for transmitting uplink data from a wireless device via at least two access nodes. The exemplary network flow of FIG. 11 may be implemented using components similar to those depicted in system 100, such as a network 1101, gateway node(s) 1102, donor access node 1110, relay access node 1120, and wireless device 1140. In this embodiment, communication link 1103 may comprise any interface capable of connecting gateway node(s) 1102 to a packet-based network 1101, such as an S5 interface. Communication link 1106 comprises any interface capable of connecting gateway node(s) 1102 to donor access node 1110, such as an S4 or S5 interface, S11 interface, or S1-MME or S1-U interface. Further, donor access node 1110, relay access node 1120, and wireless device 1140 communicate with one another via any number of wireless air-interfaces using LTE-uu or other wireless interfaces. Although FIG. 11 depicts components arranged (and steps performed) in a particular order for purposes of illustration and discussion, the components and operations discussed herein are not limited to any particular order or arrangement. One skilled in the art, using the disclosures provided herein, will appreciate that various features described herein can be omitted, rearranged, combined, and/or adapted in various ways. For example, although not shown herein, any number of additional gateways such as PDN gateways (P-GW), proxy servers, home subscriber servers (HSS), and signaling performed between elements, may be apparent to those having ordinary skill in the art in light of this disclosure.

Further, as described herein, wireless device 1140 is capable of dual connectivity, i.e. simultaneously communicating with both donor access node 1110 and relay access node 1120. Alternatively or in addition, wireless device 1140 may be configured with multi-access PDN connectivity (MAPCON), whereby wireless device 1140 can send and receive data packets using two network addresses associated therewith. For example, wireless device 1140 may be configured to generate a PDU, split the PDU into two data portions (data portion 1 and data portion 2), define a source address of the first and second data portions respectively to first and second network addresses (i.e. $IP_1$ and $IP_2$) of wireless device 1140, transmit the first data portion to donor access node 1110 via a first bearer 1161, and transmit the second data portion to donor access node 1110 via a combination of second and third bearers 1162 and 1164 using relay access node 1120. Donor access node 1110 is configured to change the source address of the second data portion to the first network address (i.e. $IP_1$), and forward both data portions to gateway node(s) 1102, upon which the original PDU is regenerated and forwarded to network 1101.

Donor access node 1110 may further be configured to support two network addresses of wireless device 1140 based on an attach request received at donor access node 1110 from wireless device 1140. The attach request may indicate that wireless device 1140 is capable of attaching to both donor access node 1110 and relay access node 1120 simultaneously. Alternatively or in addition, donor access node 1110 may be configured to determine a MAPCON capability of wireless device 1140 based on a device capabilities message received at donor access node 1110. Further, the addresses $IP_1$ and $IP_2$ may comprise two different network addresses due to the different gateways that the donor access node and relay access node connect to. Thus, wireless device 1140, donor access node 1110, and/or gateway node(s) 1102, may be configured to map first network address $IP_1$ to one or more of corresponding bearer(s) 1161, 1163, 1165, and second network address $IP_2$ to one or more of corresponding bearer(s) 1162, 1164. For example, since bearers 1161, 1163, and 1165 are associated with a direct transmission path between donor access node 1110 and wireless device 1140, these bearers are mapped to first network address $IP_1$, while bearers 1162 and 1164 are mapped to second network address $IP_2$ by virtue of their association with a transmission path via relay access node 1120.

Wireless device 1140 is configured to perform method D, further described below with respect to FIG. 12. Briefly, uplink data generated at wireless device 1140 and addressed to an external destination node may be split, at wireless device 1140, into first and second portions of data intended to be transmitted to network 1101 via donor access node 1110 and relay access node 1120 respectively. Similar to the downlink data, the uplink data may comprise a protocol data unit (PDU), such as a data packet or similar unit of data. Further, wireless device 1140 may be configured to define a source address of each of the first and second portions of data as first and second network addresses (i.e. $IP_1$ and $IP_2$) respectively due to the different gateways that the donor access node and relay access node connect to. Wireless device 1140 may be configured to split the PDU based on a load of each of donor access node 1110 and relay access node 1120. Further, the first and second IP addresses may be mapped to different bearers. Each bearer is associated with a different access node. For example, a first bearer may comprise a first radio bearer 1161 set up between the first network address of wireless device 1140 and donor access node 1110, and the second bearer is associated with relay access node 1120, and comprises a combination of a second radio bearer 1162 set up between the second network address of wireless device 1140 and the relay access node 1120, and a third radio bearer 1164 set up between the relay access node 1120 and the donor access node 1110.

Thus, at 1152, the wireless device 1140 may transmit the first data portion directly to the donor access node 1140 within the first radio bearer 1161, and transmit the second portion to the relay access node 1120 within the second radio bearer 1162. Upon receiving the second portion of data, relay access node 1120 is configured to perform method E, further described below with reference to FIG. 13. Briefly, relay access node 1120 encapsulates the second data portion within a virtual bearer 1164 that is set up between the relay access node 1120 and donor access node 1110. The portion of data may comprise the second portion of data split at the wireless device 1140. Further, the relay access node 1120 modifies a header of the virtual bearer 1164 to include a unique indicator, which enables the donor access node 1110 to determine that the portion of data received from the relay access node 1120 is a portion of the PDU split at the wireless device 1140. Thus, at 1153, the relay access node 1120 transmits the portion of data to the donor access node 1110 via the virtual bearer 1164. The virtual bearer 1164 may include a radio bearer between the relay access node 1120 and the donor access node 1110.

Upon receiving the first portion of the split PDU from the first network address of wireless device 1140 and the second portion of the split PDU from the second network address of the wireless device 1140 via relay access node 1120, donor access node may be configured to perform method F, further described below with reference to FIG. 14. Briefly, the donor access node 1110 may be configured to determine that the second portion (i.e. data portion 2) is a portion of the split PDU based on a unique indicator within a header of the virtual bearer 1164. The donor access node 1110 may further be configured to modify a source address of the second portion of the split PDU from the second network address of the wireless device 1140 to the first network address of the wireless device 1140, such that both first and second data portions are sourced from the first network address of the wireless device 1140. Subsequently, at 1154, the donor access node transmits the first and second data portions to gateway node 1102, whereupon the gateway node combines or reassembles the first and second data portions to form the original PDU, and transmits the PDU at 1155 to the external destination node via network 1101, with the original PDU indicating the first network address of the wireless device 1140 as the source address.

Figure 12:
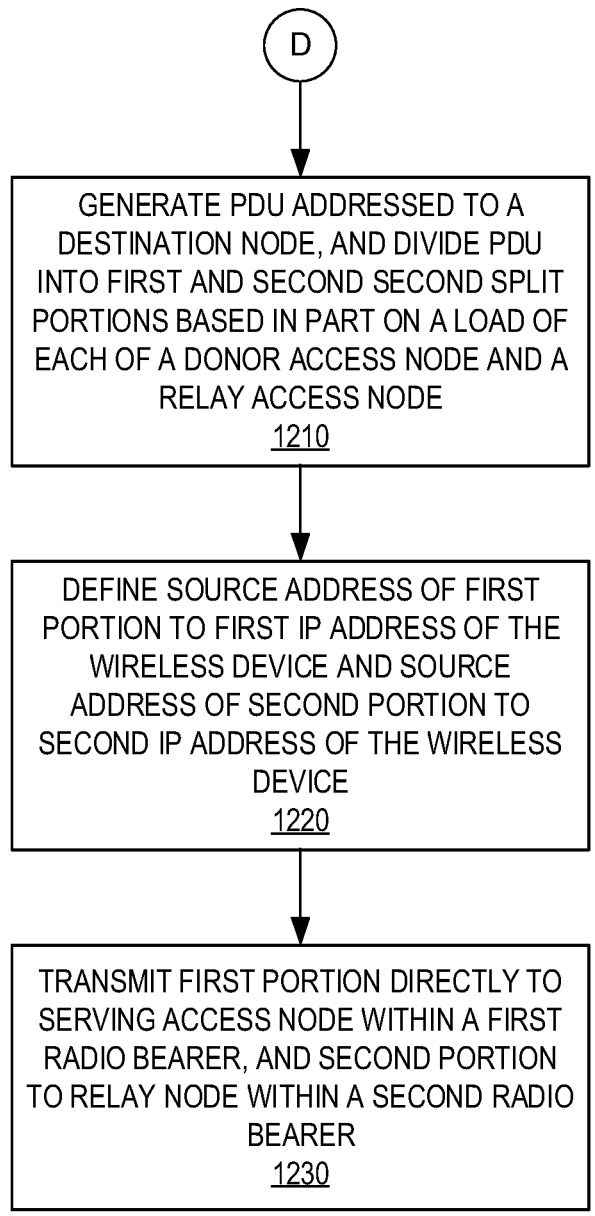
FIG. 12 depicts an exemplary method for splitting uplink data into portions and transmitting the portions from at least two network addresses of a wireless device.

FIG. 12 depicts an exemplary method for splitting uplink data into portions and transmitting the portions from at least two network addresses of a wireless device. The exemplary method of FIG. 12 may be implemented using components similar to those depicted in systems 100 and 1100, such as wireless device 140, 1140. Although FIG. 12 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 1210, a wireless device generates data to be transmitted to an external destination node, and divides or splits the data into first and second portions of data intended to be transmitted to the network via the donor access node and the relay access node respectively. Similar to the downlink data, the uplink data may comprise a protocol data unit (PDU), such as a data packet or similar unit of data. Further, at 1220, the wireless device may be configured to define a source address of each of the first and second portions of data as first and second network addresses of the wireless device respectively due to the different gateways that the donor access node and relay access node connect to. Both first and second network addresses may comprise IP addresses. The wireless device may further be configured to split the PDU at 1210 based on a load of each of the donor access node and the relay access node.

Further, the first and second IP addresses may be generated by the wireless device, and associated with the wireless device, while being mapped to different bearers. Each bearer is associated with a different access node. For example, a first bearer may comprise a first radio bearer set up between the first network address of the wireless device and the donor access node, and the second bearer is associated with the relay access node, and comprises a combination of a second radio bearer set up between the second network address of the wireless device and the relay access node, and a third radio bearer set up between the relay access node and the donor access node. Thus, at 1230, the wireless device may transmit the first data portion directly to the donor access node within the first radio bearer, and transmit the second portion to the relay access node within the second radio bearer.

Figure 13:
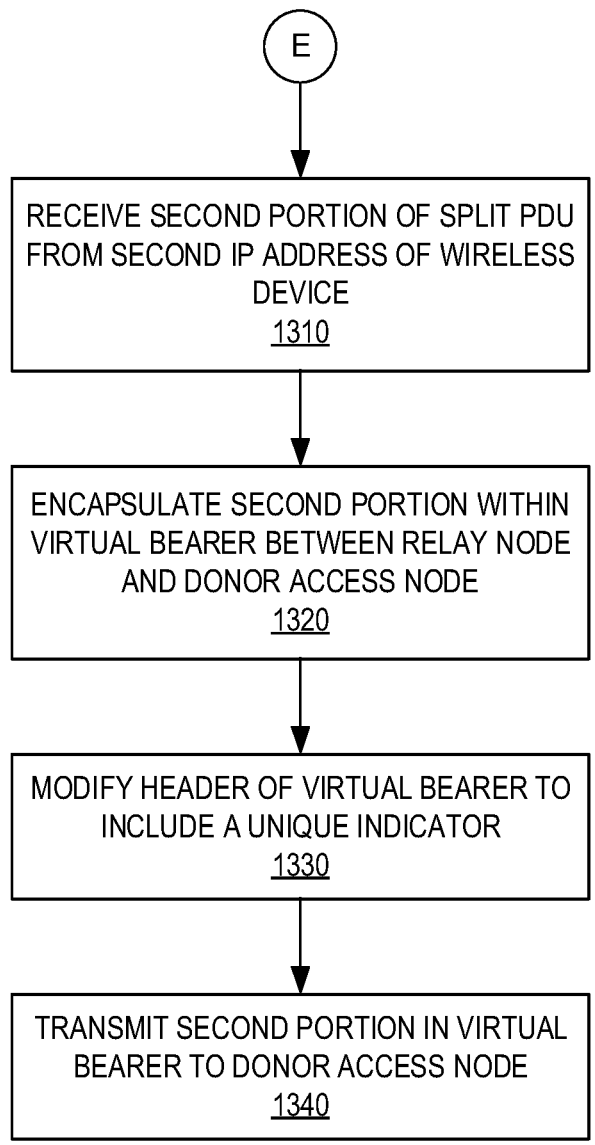
FIG. 13 depicts an exemplary method for transmitting a portion of data from a relay access node to a donor access node.

FIG. 13 depicts an exemplary method for transmitting a portion of data from a relay access node to a donor access node. The exemplary method of FIG. 13 may be implemented using components similar to those depicted in systems 100 and 1100, such as relay access node 120, 1120. Although FIG. 13 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 1310, a relay access node receives a portion of data sourced from a second network address of a wireless device. The portion of data may comprise the second portion of data split at the wireless device. At 1320, the relay access node encapsulates the second data portion within a virtual bearer that is set up between the relay access node and a donor access node. Further, at 1330 the relay access node modifies a header of the virtual bearer to include a unique indicator, which enables the donor access node to determine that the portion of data received from the relay access node is a portion of the PDU split at the wireless device. At 1340, the relay access node transmits the portion of data to the donor access node via the virtual bearer. The virtual bearer may include a radio bearer between the relay access node and the donor access node.

Figure 14:
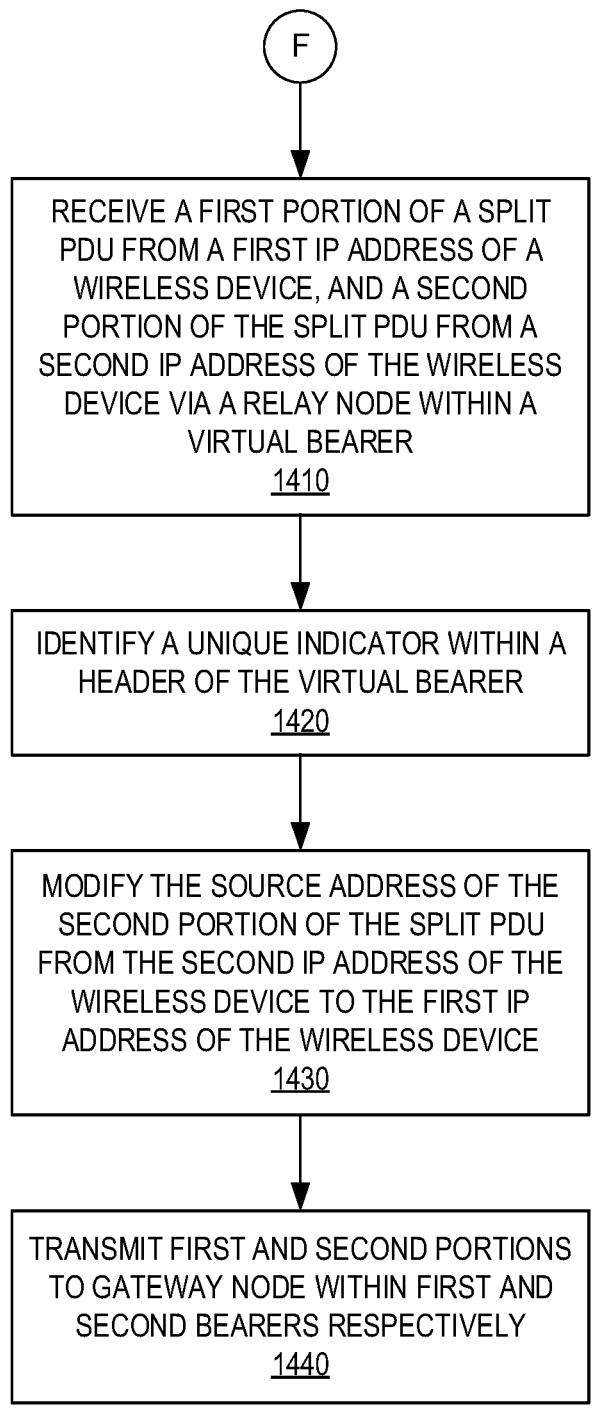
FIG. 14 depicts an exemplary method for transmitting portions of uplink data from a donor access node to a gateway node.

FIG. 14 depicts an exemplary method for transmitting portions of uplink data from a donor access node to a gateway node. The exemplary method of FIG. 14 may be implemented using components similar to those depicted in systems 100 and 1100, such as donor access node 110, 1110. Although FIG. 14 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 1410, a donor access node receives a first portion of a split PDU from a first network address of a wireless device, and a second portion of the split PDU from a second network address of the wireless device via a relay access node. The first portion of the split PDU may be sourced from a first network address of the wireless device, and the second portion of the split PDU may be sourced from a second network address of the wireless device. The second portion of the split PDU may be received in a virtual bearer set up between the relay access node and the donor access node. Further, at 1420, the donor access node may determine that the second portion is a portion of the split PDU based on a unique indicator within a header of the virtual bearer. Based thereon, the donor access node may further be configured to modify, at 1430, a source address of the second portion of the split PDU from the second network address of the wireless device to the first network address of the wireless device, such that both first and second data portions are sourced from the first network address of the wireless device. Subsequently, at 1440, the donor access node transmits the first and second data portions to a gateway node, whereupon the gateway node combines or reassembles the first and second data portions to form the original PDU, and transmits the PDU to the external destination node, with the original PDU indicating the first network address of the wireless device as the source address.

Figure 15:
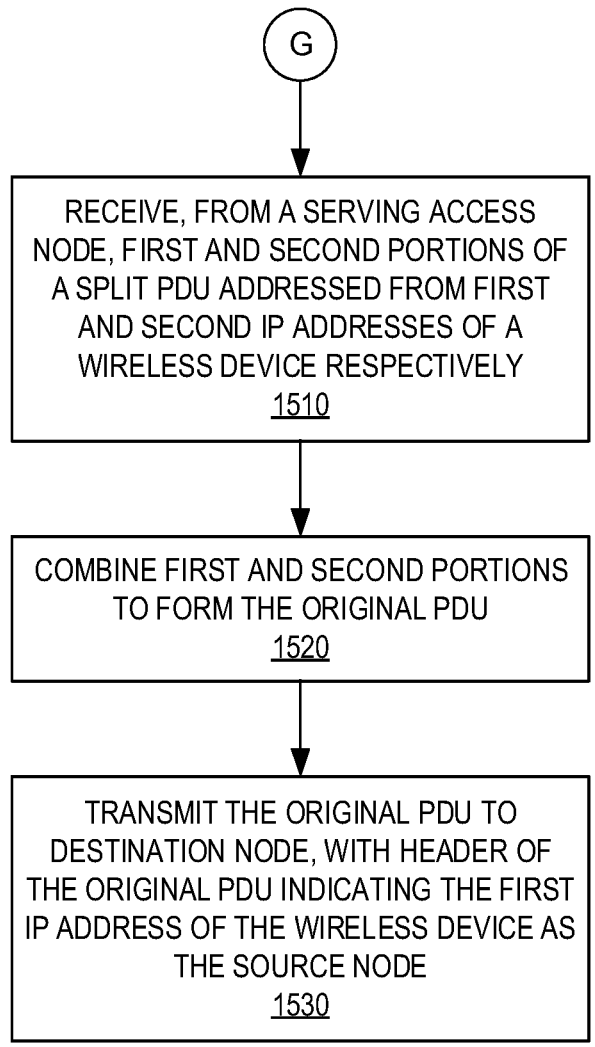
FIG. 15 depicts an exemplary method for transmitting portions of uplink data from a gateway node to a destination node.

FIG. 15 depicts an exemplary method for transmitting portions of uplink data from a gateway node to a destination node. The exemplary method of FIG. 15 may be implemented using components similar to those depicted in systems 100 and 1100, such as gateway node(s) 102, 1102. Although FIG. 15 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 1510, a gateway node(s) receive first and second portions of a split PDU from a donor access node, wherein the first and second portions are respectively addressed from first and second network addresses of a wireless device in communication with the donor access node and a relay access node. At 1520, the gateway node(s) combines the first and second portions to form the original PDU. Not illustrated herein, but similar to the unique indicator provided by the relay access node, the gateway node(s) may determine that the first and second portions comprise portions of a split PDU based on a unique indicator within a header of each data portion or bearer associated therewith. The unique indicator may comprise any alphanumeric string within a portion of the header, such as an IP header of the associated bearers. Subsequently, at 1530, the reassembled (i.e. original) PDU is transmitted to the destination node, with a header of the reassembled PDU indicating the first network address of the wireless device as the source address of the PDU.

Figure 16:
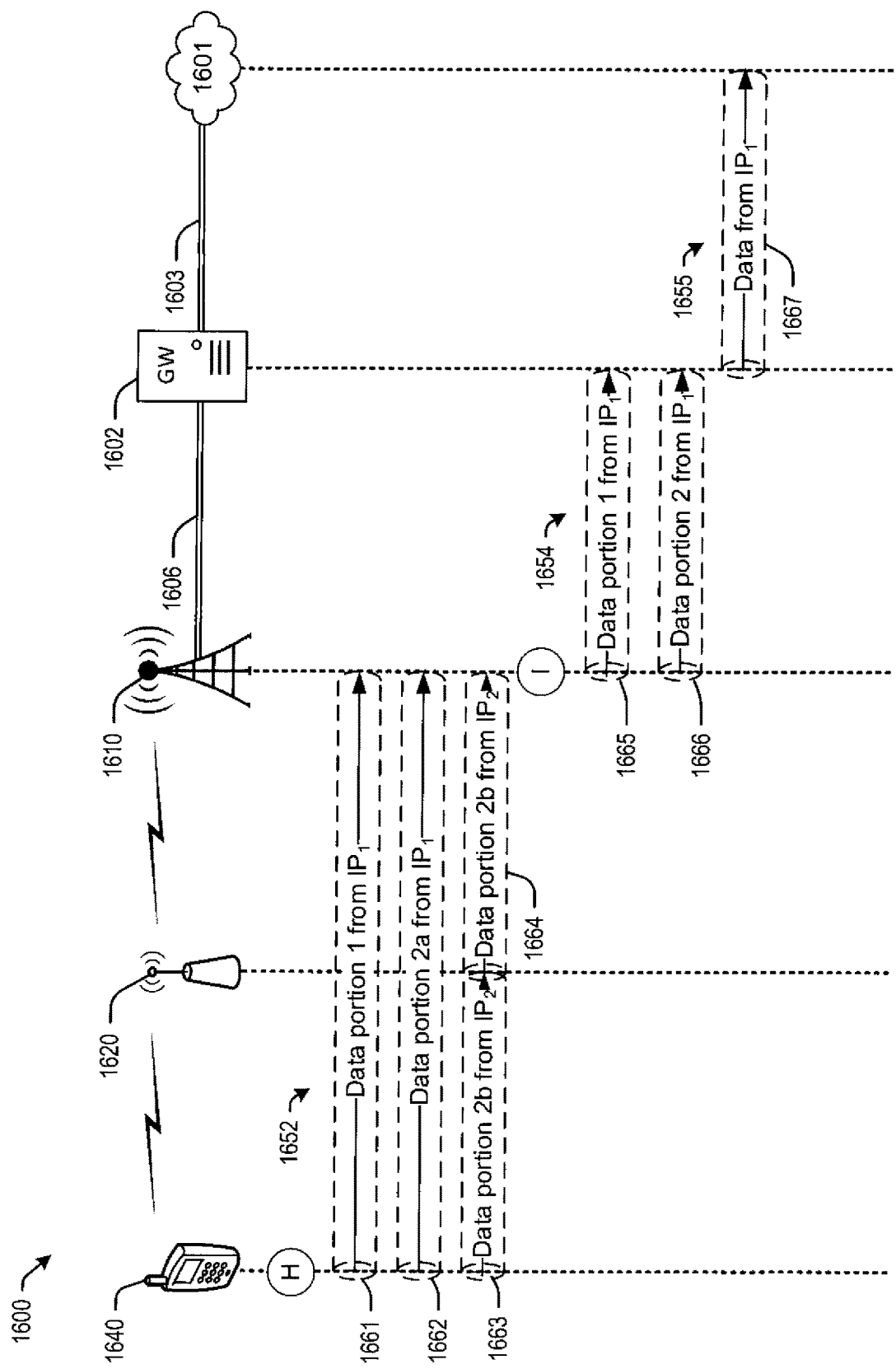
FIG. 16 depicts another exemplary network flow for transmitting uplink data from a wireless device via at least two access nodes.
Figure 17:
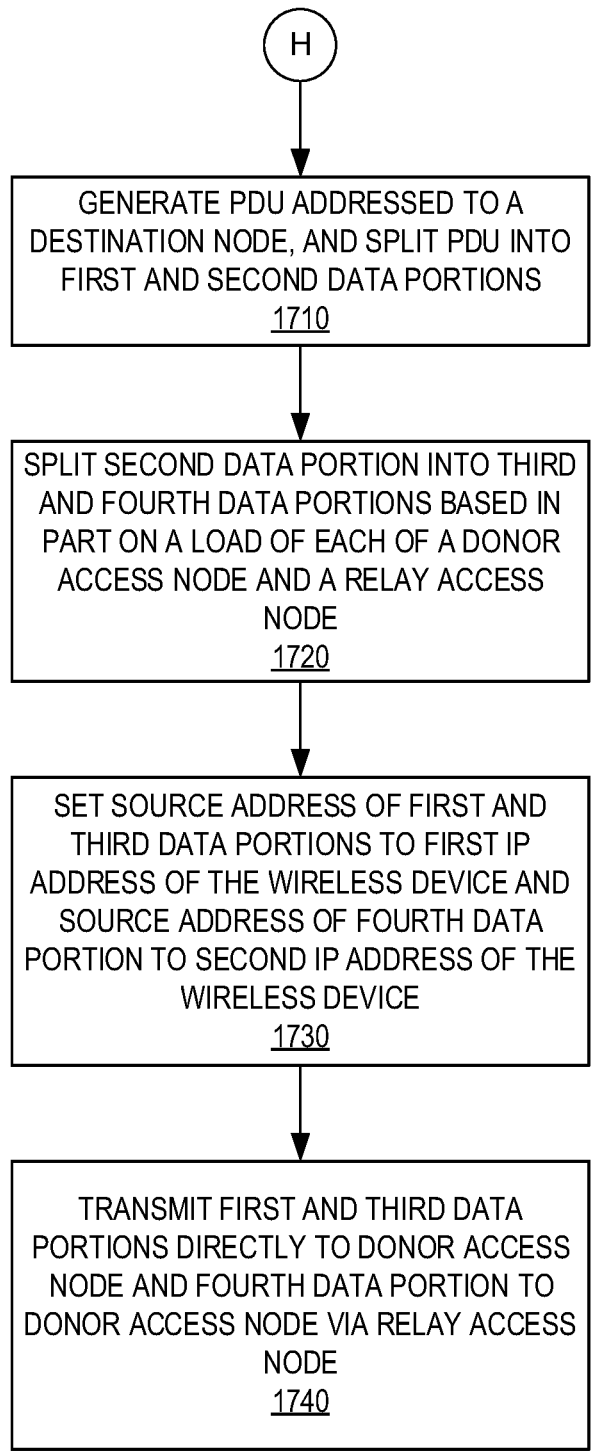
FIG. 17 depicts another exemplary method for splitting uplink data into portions and transmitting the portions from at least two network addresses of a wireless device via at least two access nodes.
Figure 18:
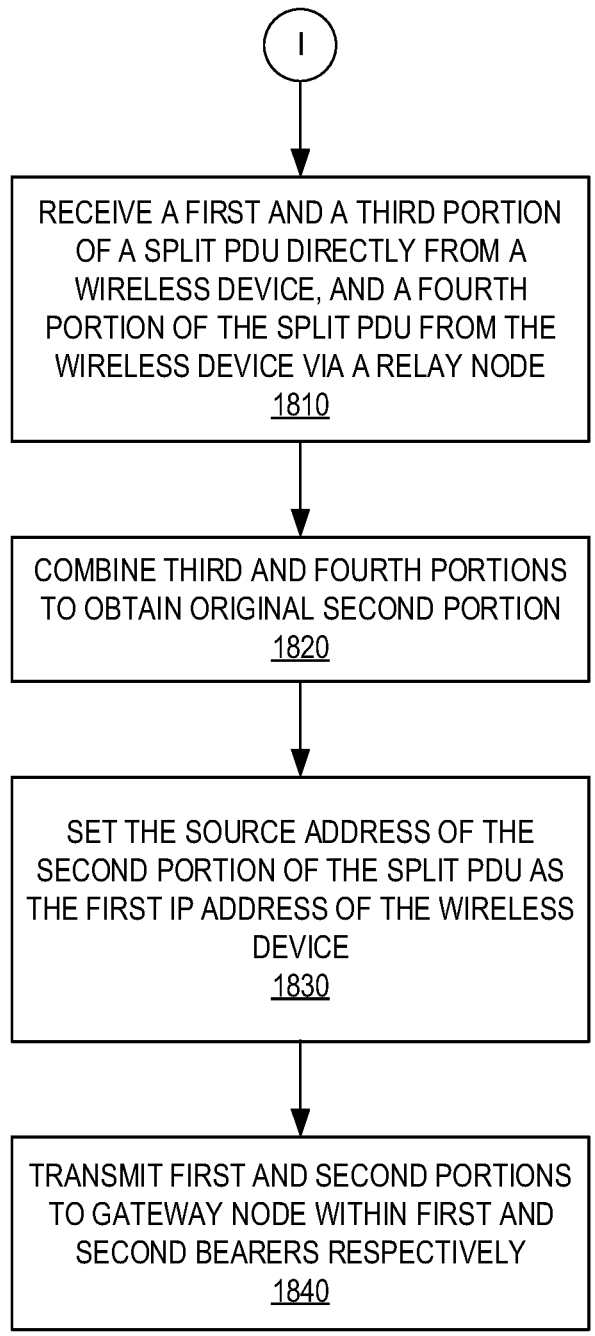
FIG. 18 depicts an exemplary method for splitting uplink data into portions and transmitting the portions from at least two network addresses of a wireless device.

In exemplary embodiments depicted herein, at least one of the first and second portions of data may be further divided or split into third and fourth portions of data. Thus, the original data intended to be transmitted to the destination node from the wireless device is split into the first, third, and fourth portions of data, with the third and fourth portions of data being portions of the previously second portion of data. FIGS. 16-18 depict exemplary embodiments associated with this further splitting of the second data portion.

For example, FIG. 16 depicts another exemplary network flow for transmitting uplink data from a wireless device via at least two access nodes. The exemplary network flow of FIG. 16 may be implemented using components similar to those depicted in system 100, such as a network 1601, gateway node(s) 1602, donor access node 1610, relay access node 1620, and wireless device 1640. In this embodiment, communication link 1603 may comprise any interface capable of connecting gateway node(s) 1602 to a packet-based network 1601, such as an S5 interface. Communication link 1606 comprises any interface capable of connecting gateway node(s) 1602 to donor access node 1610, such as an S4 or S5 interface, S11 interface, or S1-MME or S1-U interface. Further, donor access node 1610, relay access node 1620, and wireless device 1640 communicate with one another via any number of wireless air-interfaces using LTE-uu or other wireless interfaces. Although FIG. 16 depicts components arranged (and steps performed) in a particular order for purposes of illustration and discussion, the components and operations discussed herein are not limited to any particular order or arrangement. One skilled in the art, using the disclosures provided herein, will appreciate that various features described herein can be omitted, rearranged, combined, and/or adapted in various ways. For example, although not shown herein, any number of additional gateways such as PDN gateways (P-GW), proxy servers, home subscriber servers (HSS), and signaling performed between elements, may be apparent to those having ordinary skill in the art in light of this disclosure.

Further, as described herein, wireless device 1640 is capable of dual connectivity, i.e. simultaneously communicating with both donor access node 1610 and relay access node 1620. Alternatively or in addition, wireless device 1640 may be configured with multi-access PDN connectivity (MAPCON), whereby wireless device 1640 can send and receive data packets using two network addresses associated therewith. For example, wireless device 1640 may be configured to generate a PDU, split the PDU into two data portions, and transmit the two data portions to an external entity. In this exemplary embodiments, the second portions of data may be further divided or split into third and fourth portions of data (i.e. data portions 2*a* and 2*b*). Thus, the original data intended to be transmitted to the destination node from the wireless device 1640 is split into the first, third, and fourth portions of data, with the third and fourth portions of data being portions of the previously second portion of data. Alternatively or in addition, the original data is simply split into three portions of data (i.e. data portions 1, 2*a*, and 2*b*). In either case, the wireless device may be configured to perform method H, further described below with reference to FIG. 17, which generally comprises generating three split portions of data based on a cell load of each of the donor access node and the relay access node, setting a source address of the first and/or third portions of data to a first network address of the wireless device and of the fourth data portion to the second network address of the wireless device and, at 1652, transmitting the first and/or third portions of data directly to the donor access node 1610 and the fourth data portion to the relay access node 1620. The first and third data portions (i.e. data portions 1 and 2*a*) are transmitted to donor access node 1610 in first and second bearers 1661, 1662 respectively. The fourth data portion (i.e. data portion 2*b*) is transmitted to relay access node 1620 in third bearer 1663. Relay access node 1620 encapsulates the fourth data portion in a fourth bearer 1664 marked with a unique indicator, and transmits the fourth data portion within the bearer 1664 to the donor access node 1610.

Donor access node 1610 is configured to perform method I, which generally comprises receiving the first portion of a split PDU directly from a wireless device, a third portion of the split PDU directly from the wireless device 1640, and a fourth portion of the split PDU from the wireless device 1640 via relay access node 1620. The first and third portion of the split PDU may be sourced from the first network address of the wireless device 1640, and the fourth portions of the split PDU may be sourced from the second network address of the wireless device 1640. Further, the donor access node 1610 may be configured to determine that the fourth portion is a portion of the second portion of the PDU based on a unique indicator within a header of the virtual bearer 1664, as marked by relay access node 1620. The donor access node 1610 may further be configured to combine the third and fourth portions of the PDU to obtain the original second portion of the PDU (as was split by the wireless device 1640), and to modify a source address of the second portion of the split PDU as the first network address of the wireless device 1640, such that both first and second data portions are sourced from the first network address of the wireless device 1640. Subsequently at 1654, the donor access node transmits the first and second data portions to its corresponding gateway node(s) 1602, whereupon the gateway node(s) 1602 combines or reassembles the first and second data portions to form the original PDU and, at 1655, transmits the PDU to the external destination node, with the original PDU (and/or bearer 1667 encapsulating therewith) indicating the first network address of the wireless device 1640 as the source address.

FIG. 17 depicts another exemplary method for splitting uplink data into portions and transmitting the portions from at least two network addresses of a wireless device via at least two access nodes. The exemplary method of FIG. 17 may be implemented using components similar to those depicted in systems 100 and 1600, such as wireless device 140, 1640. Although FIG. 17 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 1710, a wireless device generates uplink data addressed to a destination node, and splits the uplink data into two data portions intended to be transmitted to the network via a donor access node and a relay access node respectively. Similar to the downlink data, the uplink data may comprise a protocol data unit (PDU), such as a data packet or similar unit of data. Further at 1720, the second portion of data may be further divided or split into third and fourth portions of data. Thus, the original data intended to be transmitted to the destination node from the wireless device is split into the first, third, and fourth portions of data, with the third and fourth portions of data being portions of the previously second portion of data. Alternatively or in addition, the original data is simply split into three portions of data. In either case, the wireless device may be configured to generating the split portions of data based on a cell load of each of the donor access node and the relay access node.

Further, at 1730, the wireless device may be configured to define a source address of the first and third portions of data to a first network address of the wireless device and of the fourth portions of data to the second network address of the wireless device due to the different gateways that the donor access node and relay access node connect to. Both first and second network addresses may comprise IP addresses. Further, the first and second IP addresses may be generated and associated with the wireless device, while being mapped to different bearers. Each bearer is associated with a different access node. For example, a first bearer may comprise a first radio bearer set up between the first network address of the wireless device and the donor access node, and the second bearer is associated with the relay access node, and comprises a combination of a second radio bearer set up between the second network address of the wireless device and the relay access node, and a third radio bearer set up between the relay access node and the donor access node.

Thus, at 1740, the wireless device may transmit the first and/or third portions of data directly to the donor access node and the fourth data portion to the relay access node. The first and third data portions are transmitted to the donor access node in first and second bearers respectively. The fourth data portion is transmitted to the relay access node in a third bearer, whereupon the relay access node encapsulates the fourth data portion in a fourth bearer marked with a unique indicator, and transmits the fourth data portion to the donor access node.

FIG. 18 depicts an exemplary method for splitting uplink data into portions and transmitting the portions from at least two network addresses of a wireless device. The exemplary method of FIG. 18 may be implemented using components similar to those depicted in systems 100 and 1600, such as donor access node 110, 1610. Although FIG. 18 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 1810, the donor access node receives the first portion of a split PDU directly from a wireless device, a third portion of the split PDU directly from the wireless device, and a fourth portion of the split PDU from the wireless device via a relay access node. The first and third portions of the split PDU may be sourced from the first network address of the wireless device, and the fourth portions of the split PDU may be sourced from the second network address of the wireless device. Further, the donor access node may be configured to determine that the fourth portion is a portion of the second portion of the PDU based on a unique indicator within a header of the virtual bearer, as marked by the relay access node. Thus, at 1820, the donor access node combines the third and fourth portions of the PDU to obtain the original second portion of the PDU (as was split by the wireless device). At 1830, the donor access node modifies a source address of the second portion of the split PDU as the first network address of the wireless device, such that both first and second data portions are sourced from the first network address of the wireless device. Subsequently at 1840, the donor access node transmits the first and second data portions to a gateway node, each within its own respective bearer, whereupon the gateway node combines or reassembles the first and second data portions to form the original PDU and transmits the PDU to the external destination node, as described in FIG. 15.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for communicating with a wireless device via at least two access nodes, the method comprising:
   receiving, at a donor access node coupled to a relay access node, a first portion of data and a second portion of data, wherein both first and second portions of data are addressed to a first network address of a wireless device, the first network address comprising a first unique indicator;
   modifying, by the donor access node, a destination address of the second portion of data from the first unique indicator of the wireless device to a second unique indicator of the wireless device;
   transmitting the first portion of the data to the first unique indicator of the wireless device via a first wireless communication link between the donor access node and the wireless device; and
   transmitting the second portion of the data to the second unique indicator of the wireless device via the relay access node, wherein the relay access node transmits the second portion of the data to the second unique indicator of the wireless device via a second wireless communication link between the relay access node and the wireless device.

2. The method of claim 1, wherein the first and second portions of data are received at the donor access node from a gateway node, the gateway node being configured to:
   receive a first data unit addressed to the wireless device;
   divide the first data unit to generate the first and second portions of data; and
   transmit the first and second portions of data to the donor access node in first and second virtual bearers respectively.

3. The method of claim 2, wherein the gateway node is further configured to divide the data unit into the first and second portions based in part on a load level of each of the donor and relay access nodes.

4. The method of claim 2, wherein:
   the gateway node is further configured to assign the first unique indicator in an internet protocol (IP) header of second portion of data within the second virtual bearer, and
   modifying, by the donor access node, the destination address of the second portion of data is performed upon identifying the first unique indicator.

5. The method of claim 4, wherein modifying the destination address comprises replacing the first unique indicator in an internet protocol (IP) layer of the second virtual bearer with the second unique indicator.

6. The method of claim 1, further comprising:
   encapsulating the second portion of data within a third virtual bearer; and
   transmitting the second portion of data encapsulated in the third virtual bearer to the relay access node via a third wireless communication link between the donor access node and the relay access node.

7. The method of claim 6, further comprising formatting the second portion of data encapsulated in the third virtual bearer using an X2 interface format.

8. The method of claim 1, wherein the wireless device is configured to divide a second data unit into third and fourth portions of data, the method further comprising:
   receiving, at the donor access node via the first wireless communication link, the third portion of data from the first network address of the wireless device;
   receiving, at the donor access node via the relay access node, the fourth portion of data from the second network address of the wireless device;
   modifying a source address of the fourth portion of data from the second network address to the first network address; and
   transmitting the third and fourth portions of data to a gateway node in first and second virtual bearers, respectively.

9. The method of claim 8, wherein the relay access node is configured to:
   receive the fourth portion of data from the wireless device via the second wireless communication link;
   encapsulate the fourth portion of data in a fourth virtual bearer;

modify a header of the fourth virtual bearer to include an indicator; and transmit the fourth data portion in the fourth virtual bearer to the donor access node.

10. The method of claim 9, wherein modifying the source address from the second network address to the first network address is triggered by identifying the indicator at the donor access node.

11. A system for communicating with a wireless device via at least two access nodes, the system comprising:

a donor access node configured to provide a first radio air interface to which a wireless device is attached; and a relay access node configured to attach to the first radio air interface and to provide a second radio air interface to which the wireless device is further attached;

wherein the donor access node is further configured to perform operations comprising:
receiving a first portion of data from a first network address of the wireless device via the first radio air interface, wherein the first network address comprises one of at least two network addresses of the wireless device;
transmitting the first portion of data to a gateway node in a first virtual bearers;

wherein the relay access node is further configured to perform operations comprising:
receiving, via the second radio air interface, a second portion of data from a second network address of the wireless device;
encapsulating the second portion of data in a second virtual bearer set up between the relay access node and the donor access node;
modifying a header within the second virtual bearer to include an indicator; and
transmitting the second data portion in the second virtual bearer to the donor access node; and wherein the donor access node is further configured to perform operations comprising:
receiving the second portion of data from the relay access node;
de-encapsulating the second portion of data;
modifying a source address of the second portion of data from the second network address to the first network address; and
transmitting the second portion of data to the gateway node in a third virtual bearer.

12. The system of claim 11, wherein the wireless device is further configured to:
divide an uplink data unit into the first and second portions of data;
transmit the first portion of data to the donor access node using the first network address; and
transmit the second portion of data to the relay access node using the second network address.

13. The system of claim 12, wherein the gateway node is configured to:
combine the first and second portions of data to reconstruct the uplink data unit; and
transmit the uplink data unit to a destination node.

14. The system of claim 12, wherein the uplink data unit comprises a protocol data unit.

15. The system of claim 12, wherein the wireless device is further configured to:
divide the uplink data unit into first, second, and third portions of data; and
transmit the third portion of data to the donor access node using the first network address,
wherein the donor access node is further configured to:
combine the third portion of data with the first portion of data; and
transmit the combined first and third portions of data to the gateway node in the first virtual bearer.

16. The system of claim 11, wherein:
the relay access node is further configured to modify the header within the second virtual bearer to include an indicator, and
wherein the donor access node is further configured to identify the indicator in the second virtual bearer prior to de-encapsulating the second portion of data.

17. A processing node for communicating with a wireless device via at least two access nodes, the processing node being configured to perform operations comprising:
receiving, at a donor access node coupled to a relay access node, a first portion of data and a second portion of data, wherein both first and second portions of data are addressed to a first network address of a wireless device and received at the donor access node from a gateway node in first and second virtual bearers, respectively, the first network address comprising a first unique indicator;
modifying, by the donor access node, a destination address of the second portion of data from the first unique indicator to a second unique indicator of the wireless device;
transmitting the first portion of the data to the first unique indicator via a first wireless communication link between the donor access node and the wireless device; and
transmitting the second portion of the data to the second unique indicator via a combination of the donor access node and a relay access node.

18. The processing node of claim 17, wherein the operations further comprise:
dividing the second portion of data into third and fourth portions of data;
transmitting the third portion of data to the second network address of the wireless device via the donor access node; and
transmitting the fourth portion of data to the second unique indicator via the relay access node.

19. The processing node of claim 18, wherein the operations further comprise dividing the second portion of data into third and fourth portions of data based on a cell load of each of the donor access node and the relay access node.

20. The processing node of claim 17, wherein the operations further comprise:
transmitting the second portion of the data from the donor access node to the relay access node,
wherein the relay access node forwards the second portion of data to the wireless device.

* * * * *